(12) United States Patent
Wu et al.

(10) Patent No.: US 11,496,193 B2
(45) Date of Patent: Nov. 8, 2022

(54) APERIODIC CHANNEL STATE INFORMATION COMPUTATION FOR CROSS-CARRIER SCHEDULING

(71) Applicant: QUALCOMM Incorporated, San Diego, CA (US)

(72) Inventors: Liangming Wu, Beijing (CN); Yu Zhang, Beijing (CN); Chenxi Hao, Beijing (CN); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/054,234

(22) PCT Filed: May 9, 2019

(86) PCT No.: PCT/CN2019/086153
§ 371 (c)(1),
(2) Date: Nov. 10, 2020

(87) PCT Pub. No.: WO2019/214668
PCT Pub. Date: Nov. 14, 2019

(65) Prior Publication Data
US 2021/0075488 A1 Mar. 11, 2021

(30) Foreign Application Priority Data
May 11, 2018 (WO) ................ PCT/CN2018/086504

(51) Int. Cl.
*H04B 7/06* (2006.01)
*H04L 5/00* (2006.01)
(Continued)

(52) U.S. Cl.
CPC .......... *H04B 7/0626* (2013.01); *H04L 5/001* (2013.01); *H04L 5/0051* (2013.01);
(Continued)

(58) Field of Classification Search
CPC ..... H04B 7/0626; H04L 5/001; H04L 5/0051; H04L 5/0094; H04W 24/08; H04W 24/10
See application file for complete search history.

(56) References Cited

U.S. PATENT DOCUMENTS

| 11,265,050 B2 | 3/2022 | Park et al. |
| 2013/0176995 A1 | 7/2013 | Park et al. |

(Continued)

FOREIGN PATENT DOCUMENTS

| CN | 105099603 A | 11/2015 |
| CN | 105991497 A | 10/2016 |

(Continued)

OTHER PUBLICATIONS

International Search Report and Written Opinion—PCT/CN2018/086504—ISA/EPO—Feb. 13, 2019.
(Continued)

*Primary Examiner* — Deepa Belur
(74) *Attorney, Agent, or Firm* — Qualcomm Incorporated

(57) ABSTRACT

Certain aspects of the present disclosure provide techniques for aperiodic channel state information (A-CSI) feedback scheduling for cross-carriers. Certain aspects provide a method for wireless communication. The method generally includes receiving on a first component carrier (CC) signaling indicating an aperiodic channel state information (CSI) report request for a plurality of CCs; determining schedules for at least CSI reference signal (CSI-RS) transmissions on the CCs based on the received signaling; monitoring CSI-RS transmissions on the CCs according to the determined schedules; and reporting CSI feedback based on CSI-RS measurements of the CSI-RS transmissions.

26 Claims, 17 Drawing Sheets

(51) Int. Cl.
*H04W 24/08* (2009.01)
*H04W 24/10* (2009.01)

(52) U.S. Cl.
CPC ........... *H04L 5/0094* (2013.01); *H04W 24/08* (2013.01); *H04W 24/10* (2013.01)

(56) References Cited

U.S. PATENT DOCUMENTS

| | | | |
|---|---|---|---|
| 2016/0234706 A1* | 8/2016 | Liu | H04L 5/0048 |
| 2017/0359745 A1 | 12/2017 | Lee et al. | |
| 2017/0373817 A1 | 12/2017 | Ekpenyong et al. | |
| 2018/0083684 A1 | 3/2018 | He et al. | |
| 2019/0045369 A1* | 2/2019 | Harada | H04W 72/1263 |
| 2020/0136780 A1 | 4/2020 | Chen | |
| 2020/0281011 A1* | 9/2020 | Xiong | H04B 7/0623 |
| 2020/0344761 A1* | 10/2020 | Amuru | H04L 5/0044 |
| 2021/0075486 A1* | 3/2021 | Song | H04L 1/0026 |
| 2021/0143960 A1* | 5/2021 | Shimezawa | H04W 72/14 |

FOREIGN PATENT DOCUMENTS

| | | | | |
|---|---|---|---|---|
| CN | 106332091 A | | 1/2017 | |
| CN | 110098904 A | * | 8/2019 | ........... H04B 7/0626 |
| EP | 3639400 A1 | | 4/2020 | |
| WO | 2018064590 A1 | | 4/2018 | |

OTHER PUBLICATIONS

International Search Report and Written Opinion—PCT/CN2019/086153—ISA/EPO—Jul. 29, 2019.
Ericsson: "Summary of Views on CSI Reporting v2", 3GPP Draft, 3GPP TSG RAN WG1 Meeting #92bis, R1-1805551, Summary of Views on CSI Reporting v2M2, 3rd Generation Partnership Project (3GPP), Mobile Competence Centre, 650, Route Des Lucioles, F-06921 Sophia-Antipolis Cedex, France, vol. RAN WG1, No. Sanya, China, 20180416-20180420, Apr. 16, 2018, (Apr. 16, 2018), XP051427560, 21 Pages, Retrieved from the Internet: URL: http://www.3gpp.org/ftp/Meetings%5F3GPP%5FSYNC/RAN1/Docs/. [retrieved on Apr. 16, 2018] Section 2.2 and 4.
Ericsson: "Summary of Views on CSI Reporting v5", 3GPP Draft, 3GPP TSG RAN WG1 Meeting #92bis, R1-1805594, Summary of views on CSI reporting v5, 3rd Generation Partnership Project (3GPP), Mobile Competence Centre, 650, Route Des Lucioles, F-06921 Sophia-Antipolis Cedex, France, vol. RAN WG1, No. Sanya, China, 20180416-20180420, Apr. 18, 2018 (Apr. 18, 2018), XP051427661, 21 Pages, Retrieved from the Internet: URL: http://www.3gpp.org/ftp/Meetings%5F3GPP%5FSYNC/RAN1/Docs/. [Retrieved on Apr. 18, 2018]. Section 2.2.
Qualcomm Incorporated: "Maintenance for CSI Reporting", 3GPP Draft, 3GPP TSG RAN WG1 Meeting #92, R1-1802822, 3rd Generation Partnership Project (3GPP), Mobile Competence Centre, 650, Route Des Lucioles, F-06921 Sophia-Antipolis Cedex, France, vol. RAN WG1, No. Athens, Greece, 20180226-20180302, Feb. 17, 2018 (Feb. 17, 2018), XP051398235, 12 Pages, Retrieved from the Internet: URL: http://www.3gpp.org/ftp/tsg%5Fran/WG1%5FRL1/TSGR1%5F92/Docs/. [Retrieved on Feb. 17, 2018] Sections 2.1, 2.2 and 4.
Qualcomm Incorporated: "Maintenance for CSI Reporting", 3GPP Draft, 3GPP TSG RAN WG1 Meeting #92bis, R1-1804786, 3rd Generation Partnership Project (3GPP), Mobile Competence Centre, 650, Route Des-Lucioles, F-06921 Sophia-Antipolis Cedex, France, vol. RAN WG1, No. Sanya, China, 20180416-20180420, Apr. 15, 2018 (Apr. 15, 2018), XP051427053, pp. 1-15, Retrieved from the Internet: URL:http://www.3gpp.org/ftp/Meetings%5F3GPP%5FSYNC/RAN1/Docs/ [retrieved on Apr. 15, 2018] pp. 9.11, figure 4.
Supplementary European Search Report—EP19799821—Search Authority—Munich—Dec. 16, 2021.

* cited by examiner

APERIODIC CHANNEL STATE INFORMATION COMPUTATION FOR CROSS-CARRIER SCHEDULING

CROSS-REFERENCE TO RELATED APPLICATION

The present Application for Patent is a national stage application under 35 U.S.C. 371 of PCT/CN2019/086153, filed May 9, 2019, which claims priority to International Application No.: PCT/CN2018/086504, filed May 11, 2018, which are assigned to the assignee of the present application and hereby expressly incorporated by reference herein in their entireties.

BACKGROUND

Field of the Disclosure

Aspects of the present disclosure relate to wireless communications, and more particularly, to techniques for aperiodic channel state information (A-CSI) feedback scheduling for cross-carriers.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. NR is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved channel state information, such as scheduling for aperiodic feedback associated with cross-carriers, in a wireless network.

Certain aspects provide a method for wireless communication. The method generally includes receiving on a first component carrier (CC) signaling indicating an aperiodic channel state information (CSI) report request for a plurality of CCs; determining schedules for at least CSI reference signal (CSI-RS) transmissions on the CCs based on the received signaling; monitoring CSI-RS transmissions on the CCs according to the determined schedules; and reporting CSI feedback based on CSI-RS measurements of the CSI-RS transmissions.

Certain aspects provide a method for wireless communication. The method generally includes receiving on a first component carrier (CC) signaling indicating an aperiodic channel state information (CSI) report request for a plurality of CCs; determining a CSI processing time requirement based on subcarrier spacing (SCS) numerologies of the CCs; determining whether to report or drop a CSI reporting for each of the CCs based on the CSI processing time requirement; monitoring CSI reference signal (CSI-RS) transmissions on the CCs; and reporting CSI feedback based on CSI-RS measurements of the CSI-RS transmissions.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
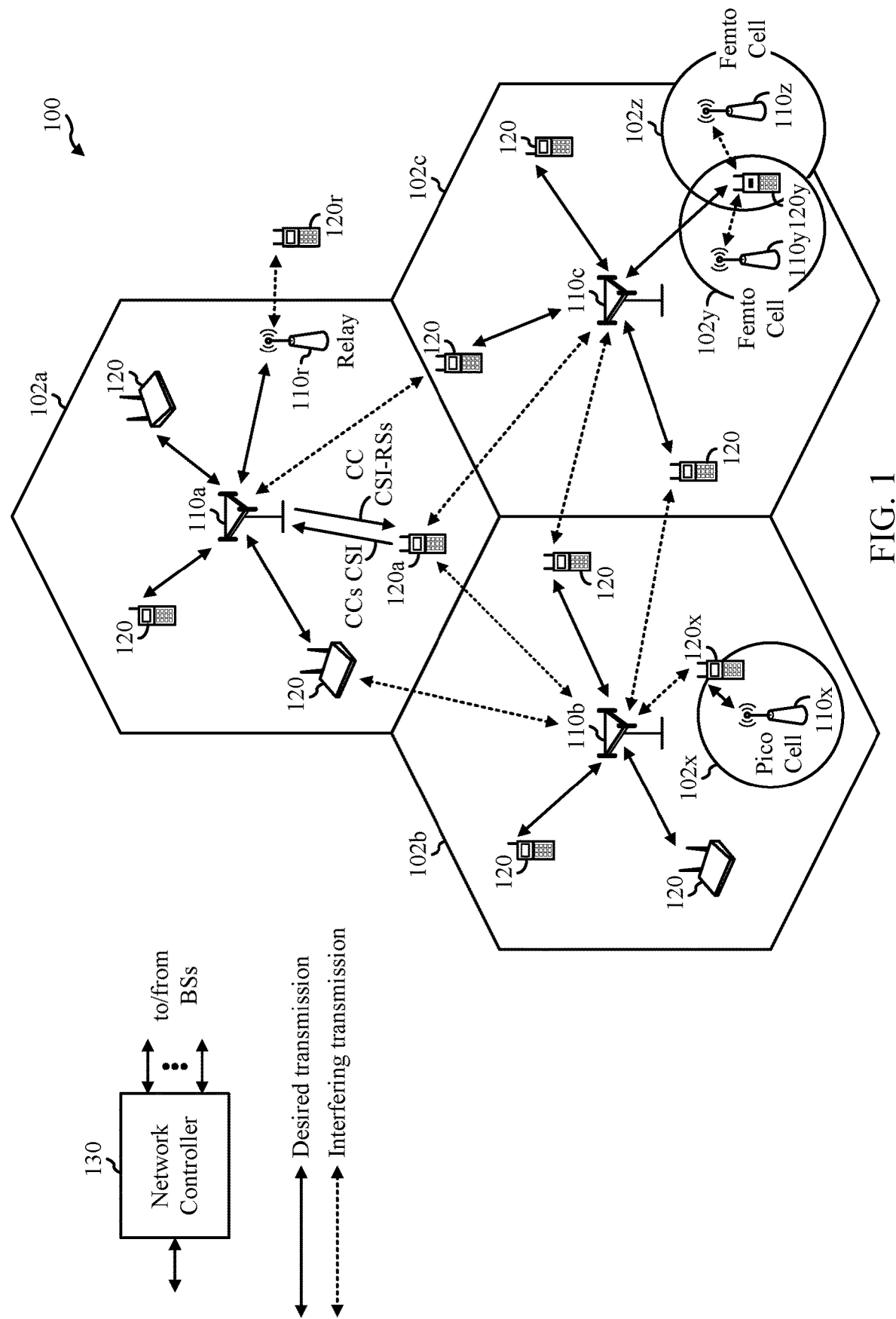
FIG. 1 is a block diagram conceptually illustrating an example telecommunications system, in accordance with certain aspects of the present disclosure.

Aspects of the present disclosure provide apparatus, methods, processing systems, and computer readable mediums for cross-carrier scheduling for aperiodic CSI feedback. CSI may refer to known channel properties of a communication link, for example, an estimation of long-term and/or short-term channel conditions. CSI is typically estimated at the receiver (e.g., a user equipment), quantized, and fed back to the transmitter (e.g., a base station) to enable the transmitter to adapt transmissions based on the current channel conditions. For example, a base station may trigger a user equipment to report aperiodic CSI associated with multiple component carriers (CCs). The user equipment may determine when to monitor reference signals associated with the CCs and report the feedback to the base station. Various scheduling schemes for cross-carrier CSI feedback and a technique for determining a CSI processing time requirement are described herein, for example, as depicted in FIGS. 7-16.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. U IRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-U IRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be an NR or 5G network.

In certain aspects, CSI feedback may be triggered via cross-carrier scheduling to report the channel properties of component-carrier. For example, the BS 110*a* may trigger the UE 120*a* to report aperiodic channel state information associated with component carriers (CCs). Various scheduling schemes for cross-carrier CSI feedback and a technique for determining a CSI processing time requirement are described herein, for example, as depicted in FIGS. 7-16.

As illustrated in FIG. 1, the wireless network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
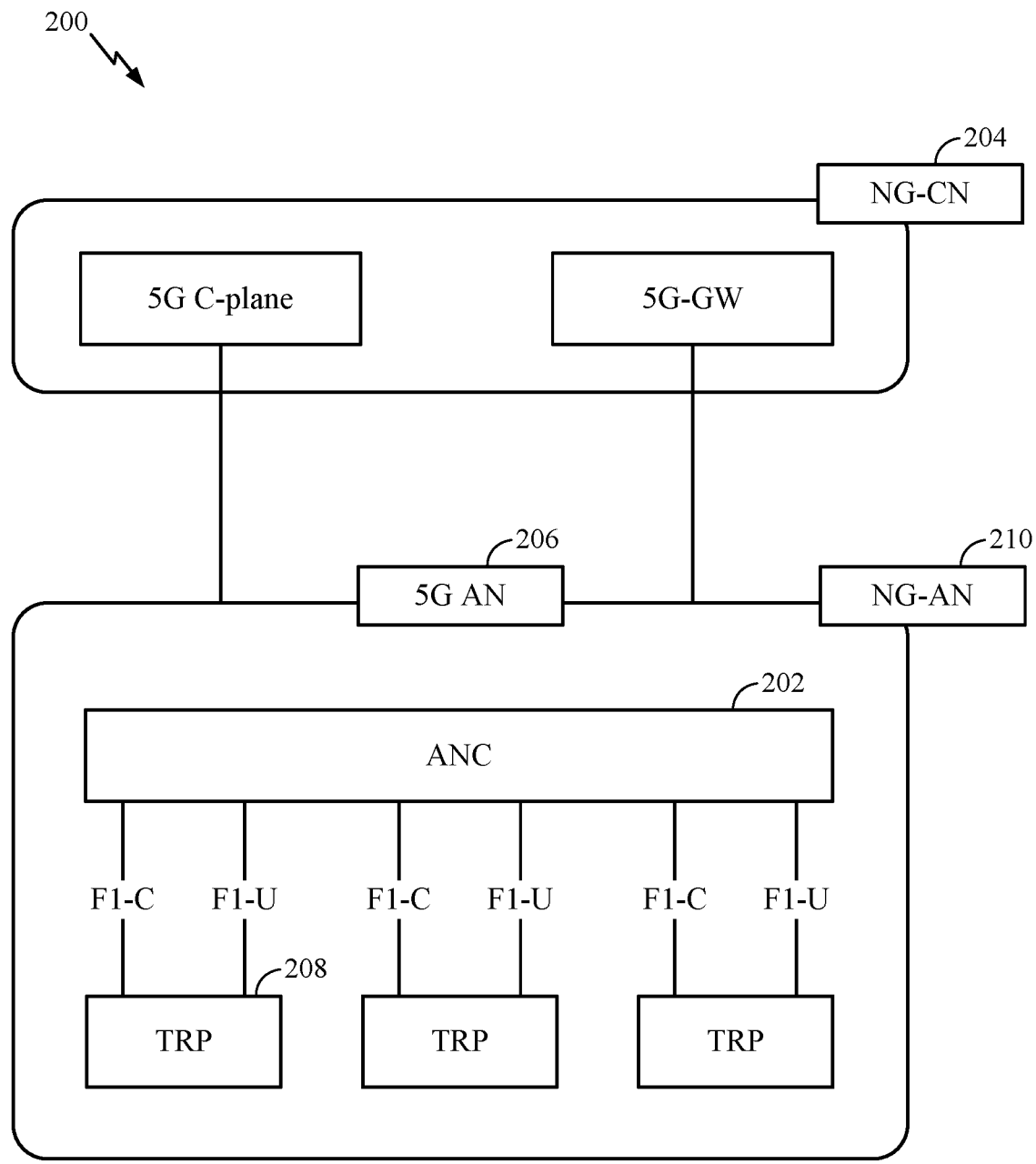
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
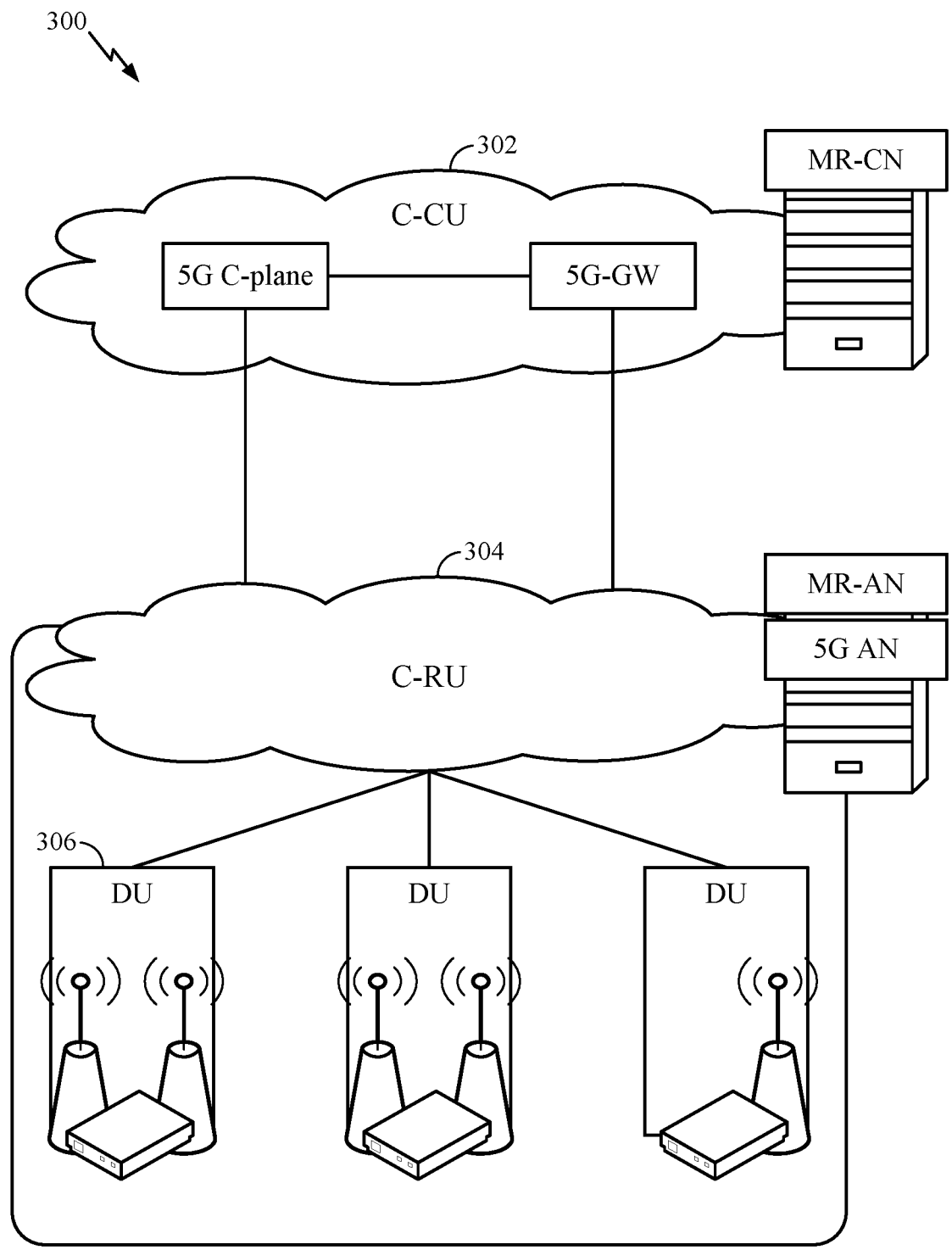
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
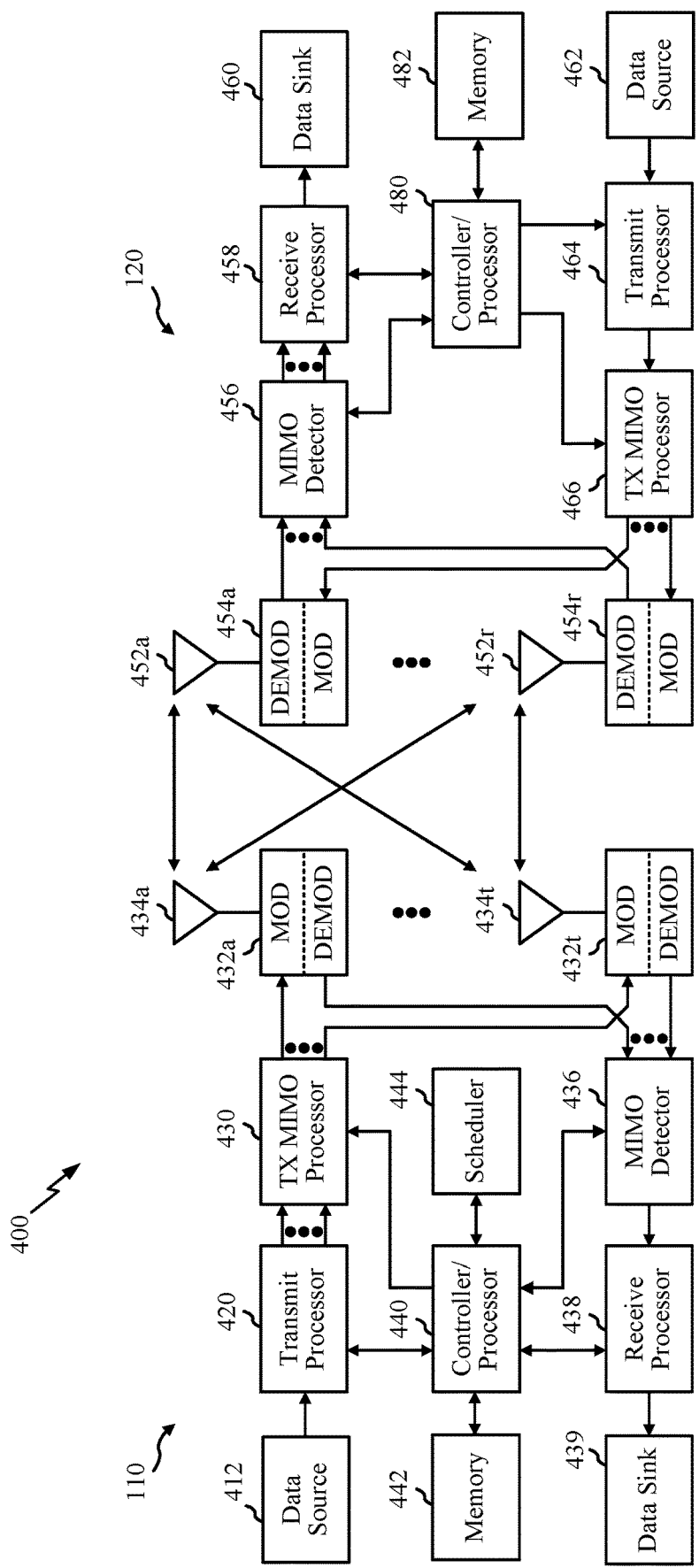
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 440, 438, and/or controller/processor 440 of the BS 110 may be used to perform the various techniques and methods described herein, such as the operations described herein and illustrated in FIGS. 7, 8, and 15.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
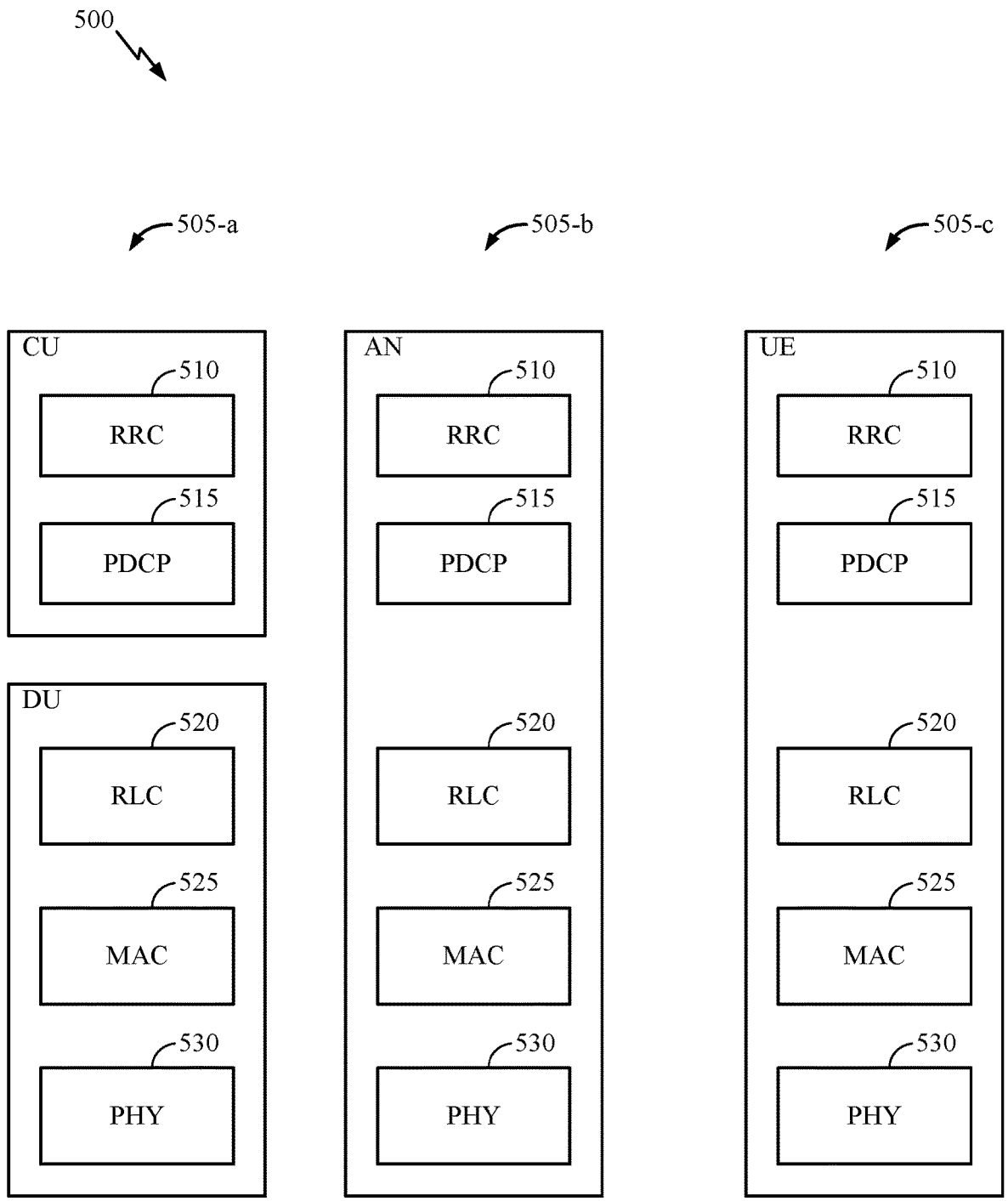
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 kHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
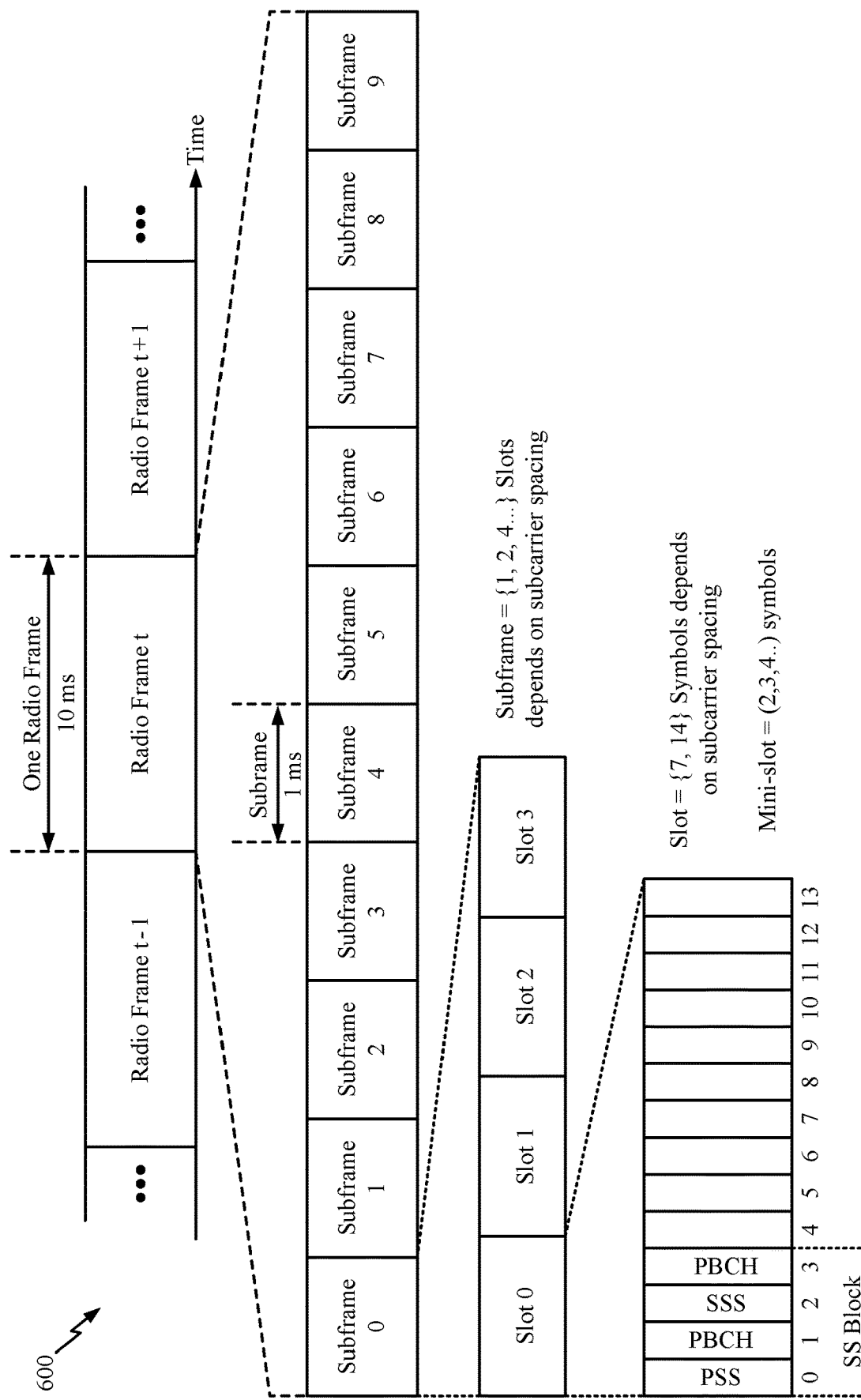
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Aperiodic Channel State Information Computation Timing for Cross-Carrier Scheduling In wireless communications, CSI may refer to known channel properties of a communication link. The CSI may represent the combined effects of, for example, scattering, fading, and power decay with distance between a transmitter and receiver. Channel estimation may be performed to determine the effects of, for example, scattering, fading, and power decay on the channel CSI may be used to adapt transmissions based on the current channel conditions, which is useful for achieving reliable communication, in particular, with high data rates in multi-antenna systems. CSI is typically estimated at the receiver, quantized, and fed back to the transmitter.

The CSI feedback may be reported according to periodic or semi-persistent schedules or on an aperiodic basis triggered, for example, by downlink signaling from a base station. For aperiodic-CSI (A-CSI) feedback, a base station may request a CSI feedback report for multiple carriers (e.g., component carriers) or cross-carriers assigned to a UE.

In cases where the component carriers have different subcarrier spacings (SCSs), the timing for such resources may not be aligned or have different transmission time intervals for slots and/or OFDM symbols. This poses an issue with determining the scheduling when the CSI feedback report is received on a first component carrier having a different SCS configuration than the component carrier in which is scheduled to measure CSI feedback. For example in certain communication systems (e.g., NR), a component carrier having an SCS numerology of $\mu=0$ for a normal cyclic prefix may have 1 slot per subframe and 14 OFDM symbols per slot; whereas a component carrier having an SCS numerology of $\mu=1$ for a normal cyclic prefix may have 2 slots per subframe and 14 OFDM symbols per slot. In other words, the transmission time for an OFDM symbol of the component carrier having an SCS numerology of $\mu=1$ is half that of an OFDM symbol of the component carrier having an SCS numerology of $\mu=0$. As such, a UE may determine the scheduling for cross-carrier feedback in order to provide full channel information to the RAN, especially in cases where the A-CSI feedback is triggered on a component carrier having a different SCS than that of the component scheduled for A-CSI feedback.

Certain aspects of the present disclosure provide techniques and apparatus for determining cross-carrier scheduling of A-CSI feedback. The cross-carrier scheduling of A-CSI feedback described herein enables the BS to more efficiently acquire full channel information across multiple component carriers or a different component carrier from which received the A-CSI report request, especially in situations where the component carriers have different SCSs.

Figure 7:
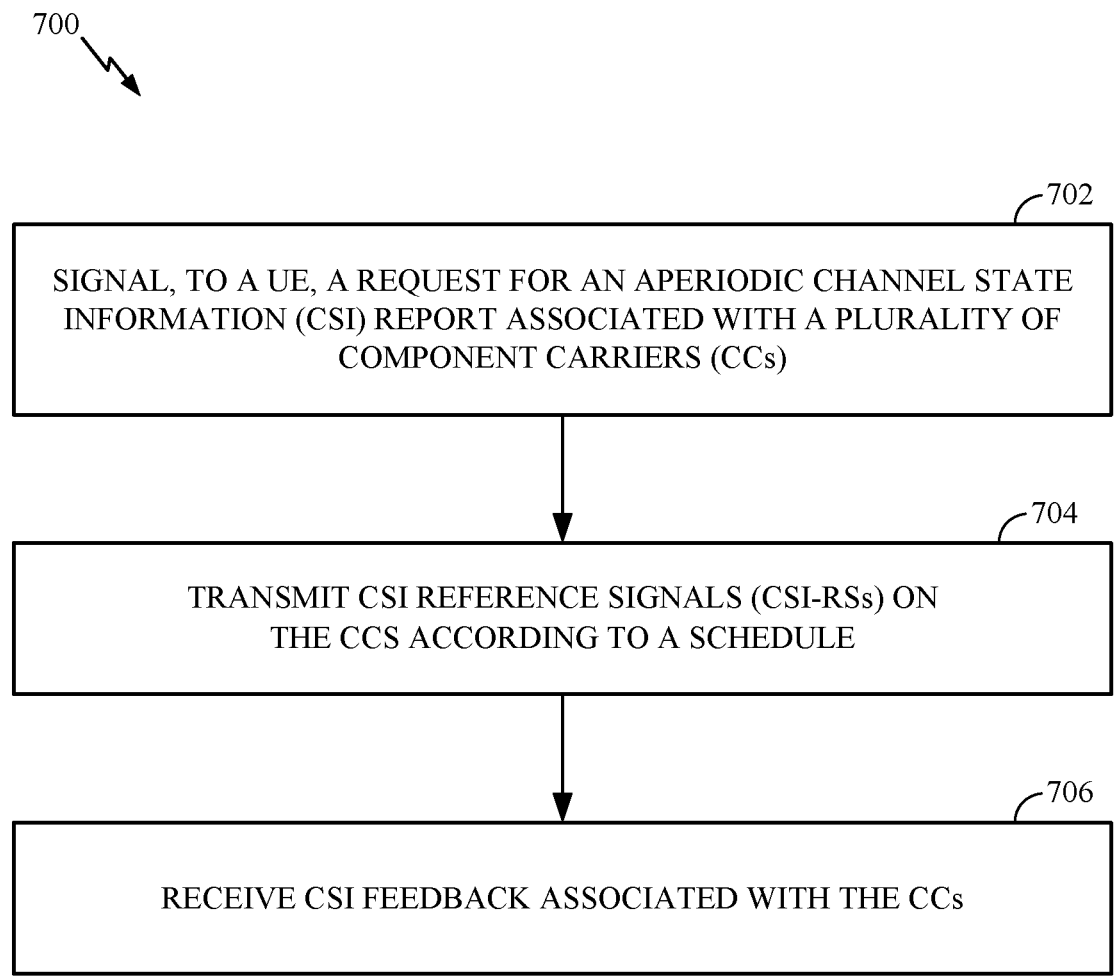
FIG. 7 is a flow diagram showing example operations for scheduling A-CSI feedback associated with multiple component carriers, in accordance with certain aspects of the present disclosure.

FIG. 7 is a flow diagram illustrating example operations 700 that may be performed, for example, by a base station (e.g., base station 110), for scheduling A-CSI feedback associated with multiple component carriers, in accordance with certain aspects of the present disclosure.

Operations 700 may begin, at 702, where the BS signals, to a UE, a request for an aperiodic channel state information (CSI) report associated with a plurality of component carriers (CCs). At 704, the BS transmits CSI reference signals (CSI-RSs) on the CCs according to a schedule. At 706, the BS receives, from a UE, CSI feedback associated with the CCs.

Figure 8:
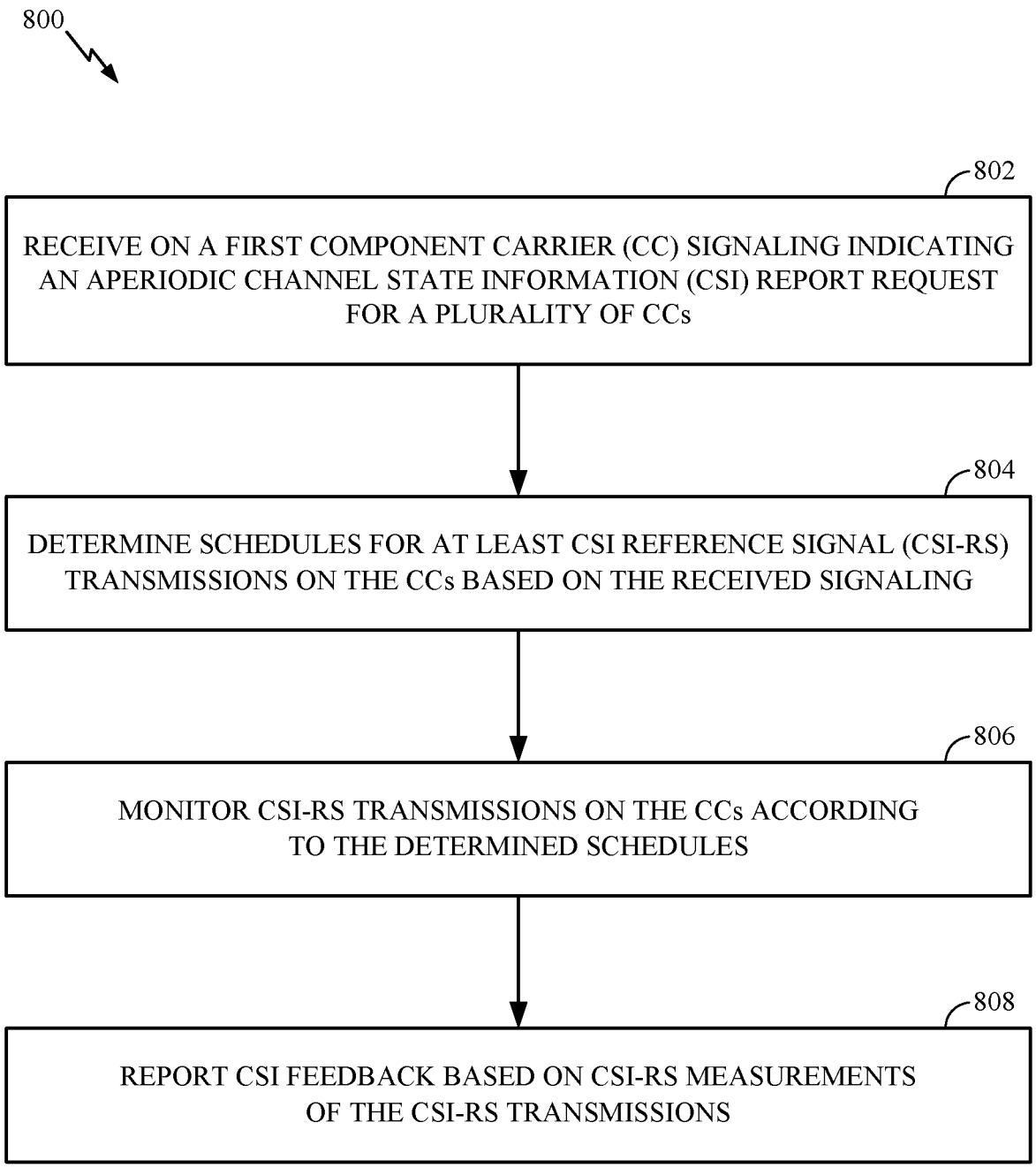
FIG. 8 is a flow diagram showing example operations of determining scheduling of A-CSI feedback, in accordance with certain aspects of the present disclosure.

FIG. 8 is a flow diagram illustrating example operations 800 that may be performed, for example, by a UE (e.g., UE 120), for determining scheduling of A-CSI feedback, in accordance with certain aspects of the present disclosure.

Operations 800 may begin, at 802, where the UE receives on a first component carrier (CC) signaling indicating an aperiodic channel state information (CSI) report request for a plurality of CCs. At 804, the UE determines schedules for at least CSI reference signal (CSI-RS) transmissions on the CCs based on the received signaling. At 806, the UE monitors CSI-RS transmissions on the CCs according to the determined schedules. At 808, the UE reports CSI feedback based on CSI-RS measurements of the CSI-RS transmissions, for example, to a base station.

Figure 9:
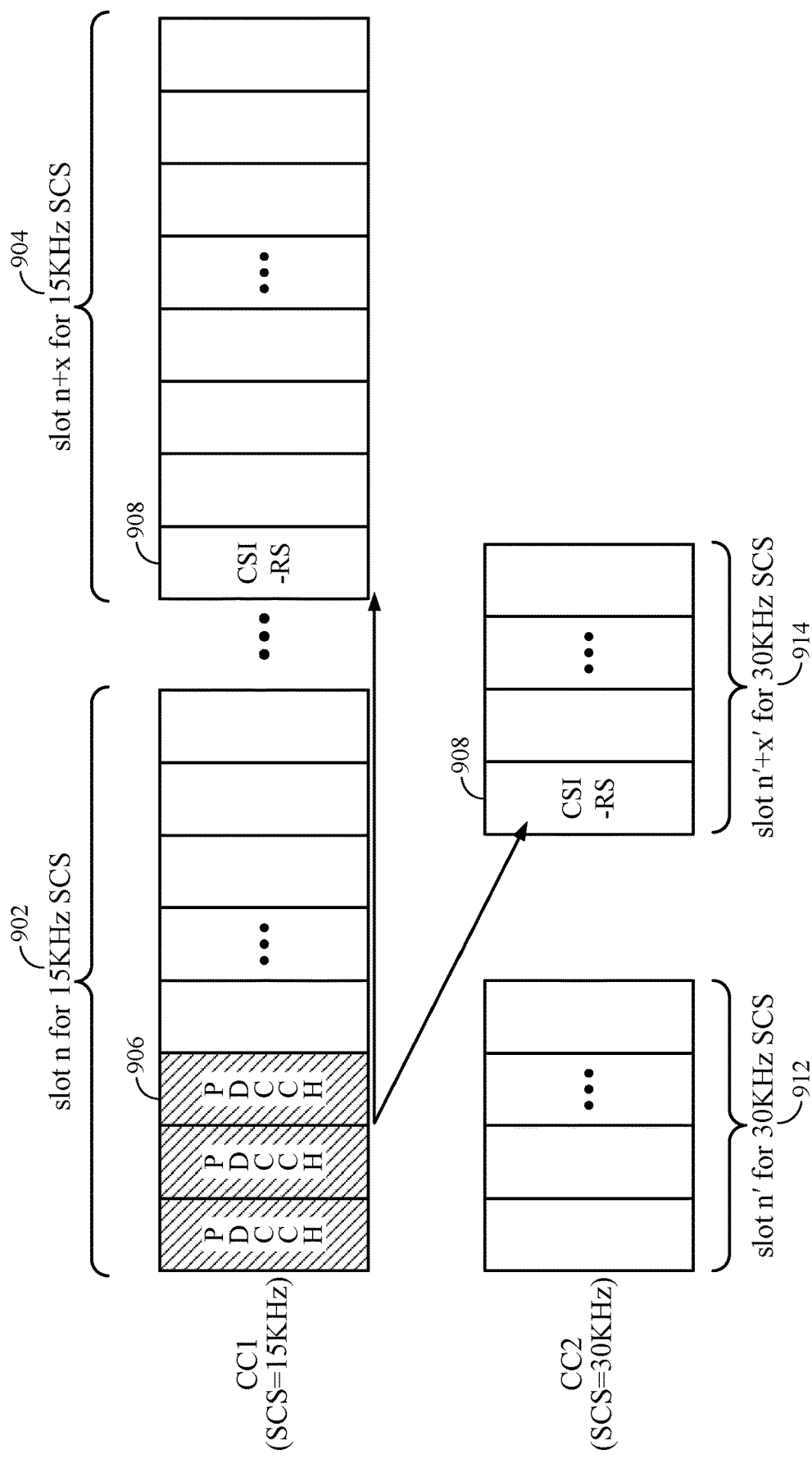
FIG. 9 is a timing diagram illustrating an example of cross-carrier scheduling for A-CSI feedback, in accordance with certain aspects of the present disclosure.

FIG. 9 is a timing diagram illustrating an example of cross-carrier scheduling for A-CSI feedback, in accordance with certain aspects of the present disclosure. As shown, a UE is configured to communicate using at least two component carriers CC1 (SCS=15 kHz) and CC2 (SCS=30 kHz). On CC1, the UE receives (e.g., at 802), from a base station, downlink control signaling 906 (e.g., DCI message), which indicates a request to provide a cross-carrier A-CSI report to the base station, via a PDCCH. Based on the downlink control signaling 906, the UE determines that the A-CSI-RS 908 is scheduled on CC1 within slot (n+x) 904, where slot n (902) corresponds to the slot in which the UE received the last symbol of the downlink control signaling 906 and x corresponds to a slot offset. The slot offset x may be pre-programmed on the UE or set by the RAN via higher layer parameters (e.g., radio resource control signaling). The UE also determines that the A-CSI-RS 918 is scheduled on CC2 within slot (n'+x') by translating the slot n (902) to a compatible reference slot n' (912) for the CC2 as further described herein. The slot offset x' for CC2 may also be pre-programmed on the UE or set by the RAN via higher layer parameters (e.g., radio resource control signaling), and the slot offset x' may have a different value or the same value as x. In other words, the UE may be configured with the slot offsets or different slot offsets depending on the SCS configuration. In certain aspects, the UE may determine the schedules for CSI-RS transmissions on CCs having the same SCS and/or different SCSs.

Figure 10:
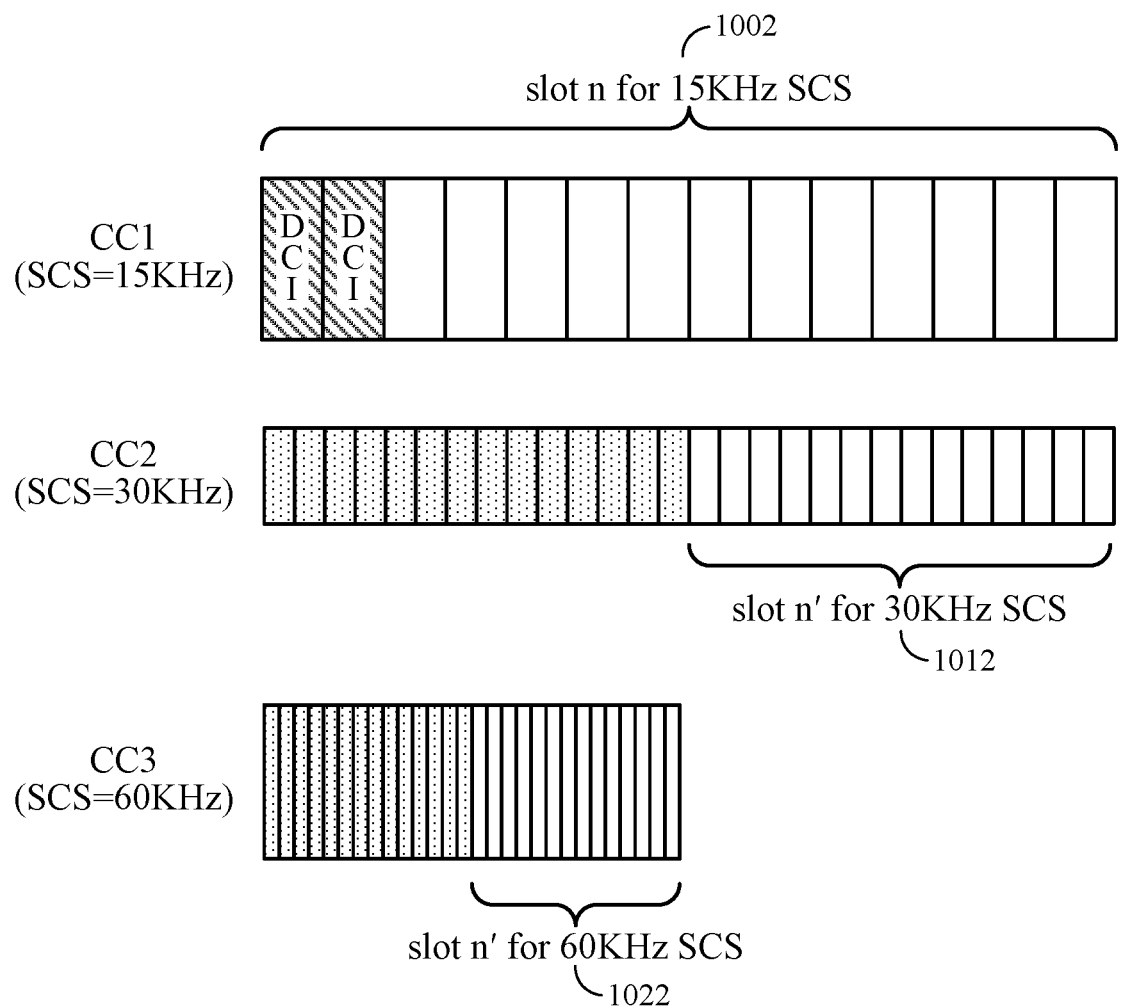
FIG. 10 is a timing diagram illustrating an example of cross-carrier scheduling for A-CSI feedback, in accordance with certain aspects of the present disclosure.

In certain aspects, slot n' may be defined as the next slot not overlapping with the last symbol of the control signaling received on a CC, in cases where the SCS for the scheduled feedback is greater than the SCS of the CC on which the control signaling triggering the feedback is received. In other words, if the SCS for the scheduled feedback is greater than the SCS of the CC on which the control signaling is received, slot n' may be defined as the earliest slot later than the last symbol of the control signaling received on the CC. For example, FIG. 10 is a timing diagram illustrating an example of cross-carrier scheduling for A-CSI feedback where the SCSs of CC2 (e.g., SCS=30 kHz) and CC3 (e.g., SCS=60 kHz) are greater than the SCS of CC1 (e.g., SCS=15 kHz) on which the control signaling is received, in accordance with certain aspects of the present disclosure. As shown, the UE receives (e.g., at 802) downlink control signaling 1004 (e.g., a DCI message), which indicates a request to provide a cross-carrier A-CSI report to the base station, via a PDCCH. Slot n (1002) for CC1 is identified as the slot having the last symbol of the downlink control signaling 1004 indicating the request for the CSI feedback. The UE may identify that the SCSs of CC2 and CC3 are greater than the SCS of CC1. Based on this identification, the UE may determine slot n' (1012) for CC2 by determining the next slot of CC2 that does not overlap with last symbol of the downlink control signaling 1004. Also depicted is the slot n' (1022) for CC3, which is the next slot of CC3 that does not overlap with the last symbol of the downlink control signaling 1004. Using the schedule for n', the UE may determine the scheduling for the CSI-RS transmissions on CC2 and CC3 as described herein with respect to FIG. 9.

Figure 11:
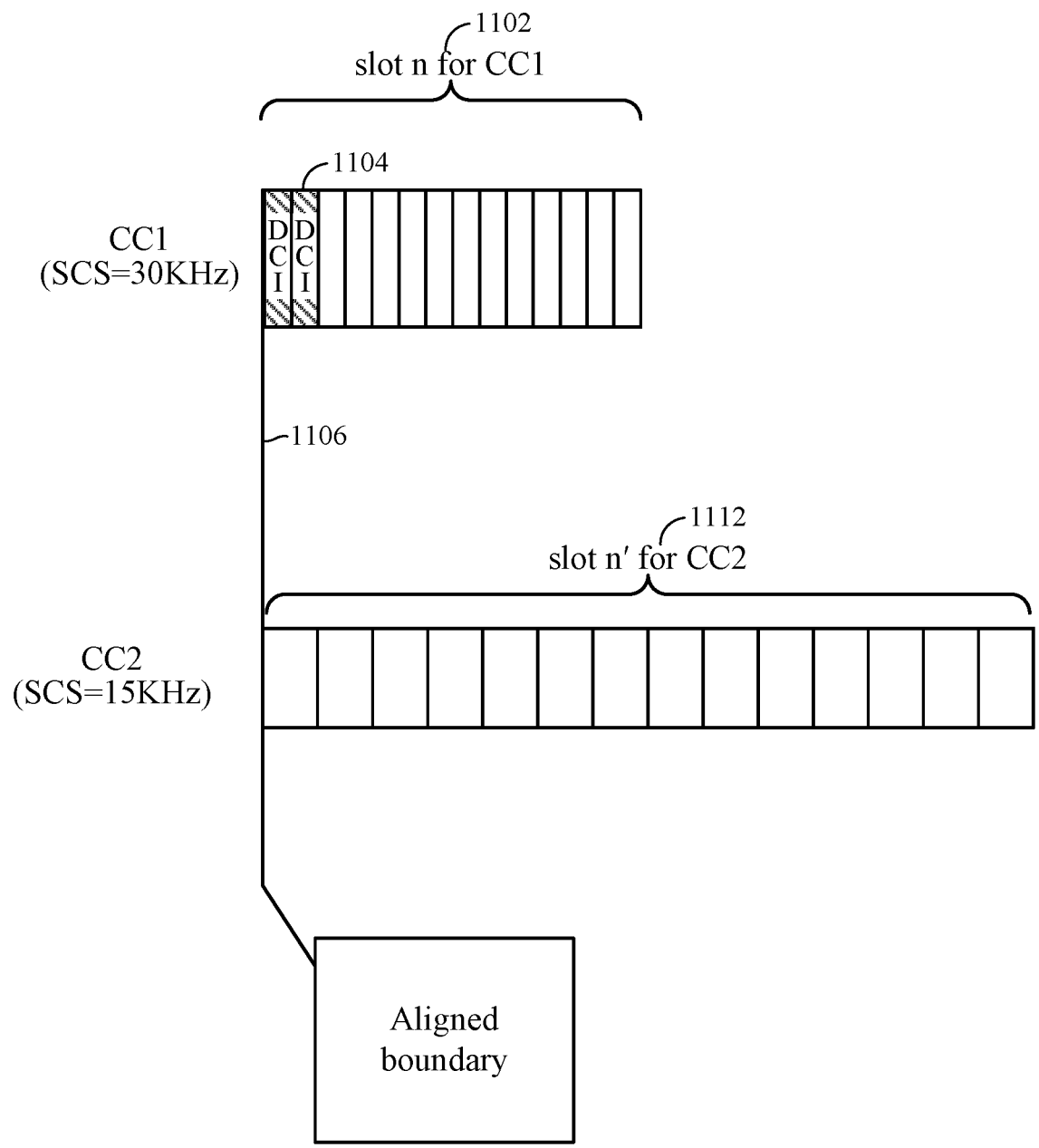
FIG. 11 is a timing diagram illustrating an example of cross-carrier scheduling for A-CSI feedback, in accordance with certain aspects of the present disclosure.

In certain aspects, slot n' may be defined as the slot that aligns with the slot of the CC on which the control signaling is received, in cases where the SCS for the scheduled feedback is less than or equal to the SCS of the CC on which the control signaling is received. For example, FIG. 11 is a timing diagram illustrating an example of cross-carrier scheduling for A-CSI feedback where the SCSs of CC2 (e.g., SCS=15 kHz) is less than the SCS of CC1 (e.g., SCS=30 kHz) on which the control signaling is received, in accordance with certain aspects of the present disclosure. As shown, the UE receives (e.g., at 802) downlink control signaling 1104 (e.g., a DCI message), which indicates a request to provide a cross-carrier A-CSI report to the base station, via a PDCCH. Slot n (1102) for CC1 is identified as the slot having the last symbol of the downlink control signaling 1104 indicating the request for the CSI feedback. The UE may identify that the SCS of CC2 is less than or equal to the SCS of CC1 on which the control signaling is received. Based on this identification, the UE may determine slot n' (1112) for CC2 by determining the slot of CC2 that aligns at the aligned boundary 1106 with slot n (1102) of CC1. The UE may determine the scheduling for the CSI-RS transmissions on CC2 based on slot n' as described herein with respect to FIG. 9.

Figure 12:
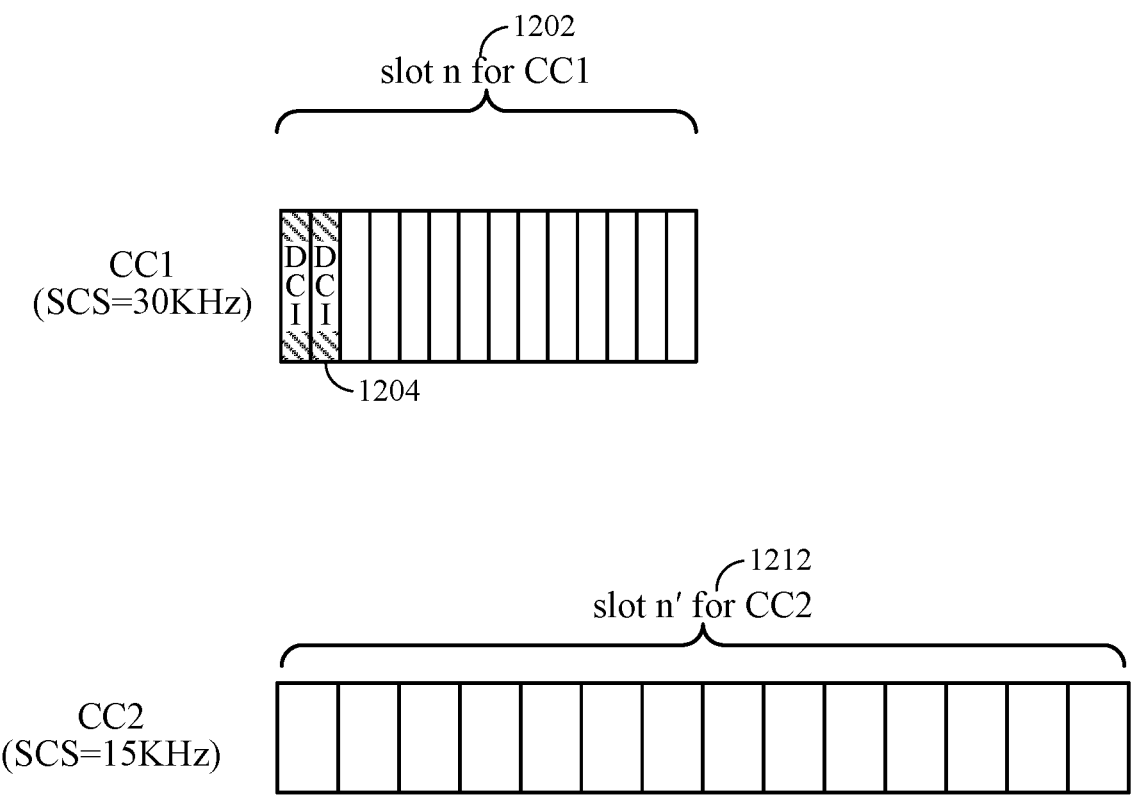
FIG. 12 is a timing diagram illustrating an example of cross-carrier scheduling for A-CSI feedback, in accordance with certain aspects of the present disclosure.

In certain aspects, slot n' may be defined as the slot that overlaps with the slot of the CC on which the control signaling is received, in cases where the UE is not configured for A-CSI feedback and the SCS for the scheduled feedback is less than the SCS of the CC on which the control signaling triggering the CSI feedback is received. In other words, slot n' may be defined as the slot that overlaps with the slot of the CC that receives the control signaling, where the UE is not expected to receive an A-CSI feedback configuration and the SCS of CCs for A-CSI-RS feedback measurements are less than SCS of DCI. For example, FIG. 12 is a timing diagram illustrating an example of cross-carrier scheduling for A-CSI feedback where the SCSs of CC2 (e.g., SCS=15 kHz) is less than the SCS of CC1 (e.g., SCS=30 kHz) on which the control signaling is received, in accordance with certain aspects of the present disclosure. As shown, the UE receives downlink control signaling 1204 (e.g., DCI message), which indicates a request to provide a cross-carrier A-CSI report to the base station, via a PDCCH. Slot n (1202) for CC1 is identified as the slot having the last symbol of the downlink control signaling 1204 indicating the request for the CSI feedback. The UE may determine slot n' (1212) for CC2 by determining the slot of CC2 that overlaps with slot n (1202) of CC1. The UE may determine the scheduling for the CSI-RS transmissions on CC2 based on slot n' as described herein with respect to FIG. 9.

Figure 13:
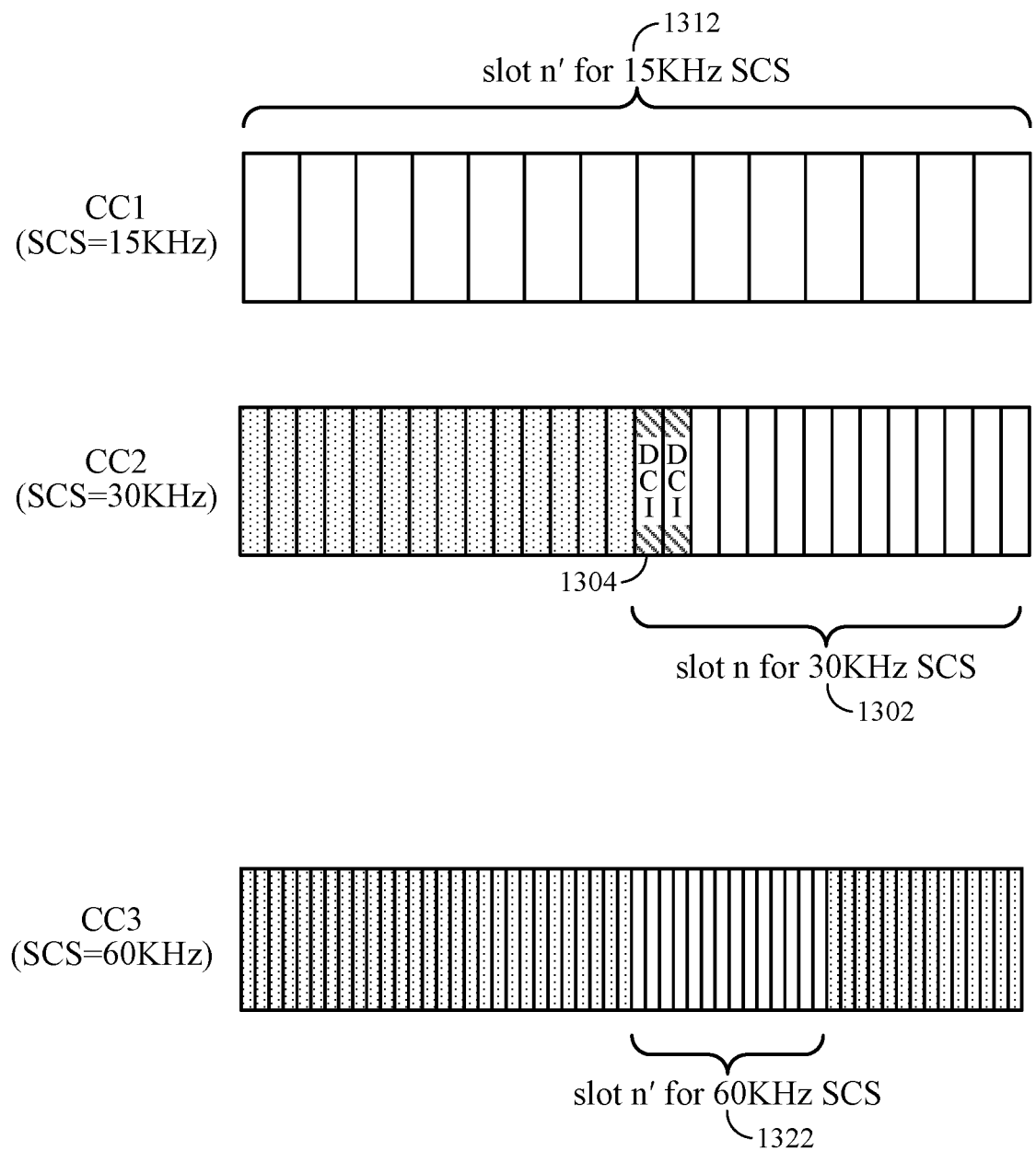
FIG. 13 is a timing diagram illustrating an example of cross-carrier scheduling for A-CSI feedback, in accordance with certain aspects of the present disclosure.

In certain aspects, slot n' may be defined as the slot that overlaps with the slot of the CC on which the control signaling is received regardless of the SCS. For example, FIG. 13 is a timing diagram illustrating an example of cross-carrier scheduling for A-CSI feedback, in accordance with certain aspects of the present disclosure. As shown, a UE is configured to communicate using three component carriers CC1 (SCS=15 kHz), CC2 (SCS=30 kHz), and CC3 (SCS=60 kHz). The UE receives downlink control signaling 1304 (e.g., a DCI message), which indicates a request to provide a cross-carrier A-CSI report to the base station, via a PDCCH on CC2. Slot n (1302) for CC2 is identified as the slot having the last symbol of the downlink control signaling 1304 indicating the request for the CSI feedback. The UE may determine slots n' (1312 and 1322) for CC1 and CC3 by determining the slots of CC1 and CC3 that overlap with slot n (1302) of CC2. The UE may determine the scheduling for the CSI-RS transmissions on CC1 and CC3 based on slot n' as described herein with respect to FIG. 9.

Figure 14:
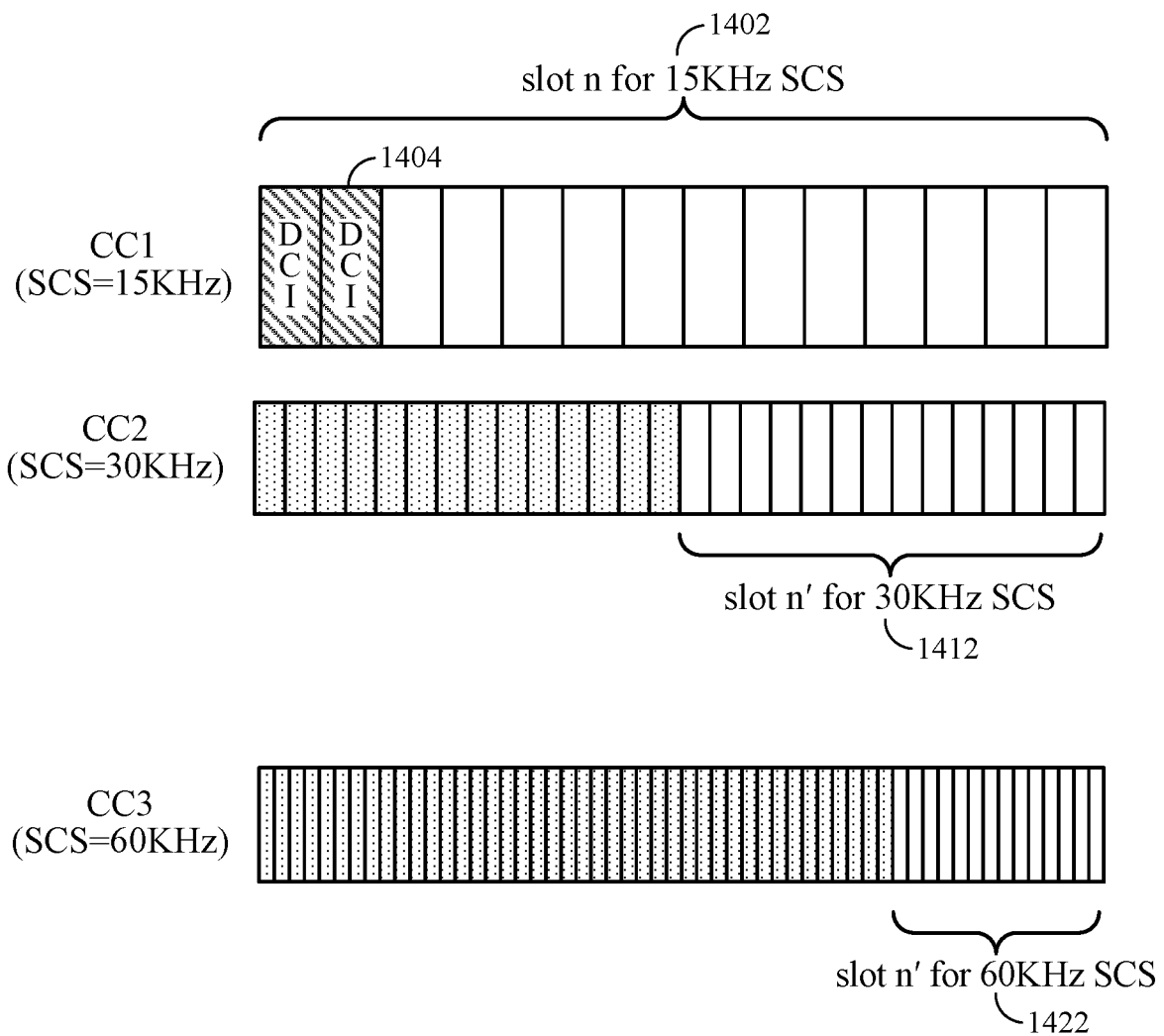
FIG. 14 is a timing diagram illustrating an example of cross-carrier scheduling for A-CSI feedback, in accordance with certain aspects of the present disclosure.

In certain aspects, slon n' may be defined as the slot that is aligned with the last symbol of the slot of the CC on which the control signaling is received, in cases where the SCS for the scheduled feedback is greater than the SCS of the CC on which the control signaling is received. For example, FIG. 14 is a timing diagram illustrating an example of cross-carrier scheduling for A-CSI feedback where the SCSs of CC2 (e.g., SCS=30 kHz) and CC3 (e.g., SCS=60 kHz) are greater than the SCS of CC1 (e.g., SCS=15 kHz) on which the control signaling is received, in accordance with certain aspects of the present disclosure. As shown, a UE is configured to communicate using three component carriers CC1 (SCS=15 kHz), CC2 (SCS=30 kHz), and CC3 (SCS=60 kHz). The UE receives downlink control signaling 1404 (e.g., a DCI message), which indicates a request to provide a cross-carrier A-CSI report to the base station, via a PDCCH on CC1. Slot n (1402) for CC1 is identified as the slot having the last symbol of the downlink control signaling 1404 indicating the request for the CSI feedback. The UE may determine slots n' (1412 and 1422) for CC2 and CC3 by determining the slots of CC2 and CC3 that align with the last symbol of slot n (1402) of CC1. In other words, slot n' may be determined as being the slot having its last symbol that aligns with the last symbol of slot n. The UE may determine the scheduling for the CSI-RS transmissions on CC2 and CC3 based on slot n' as described herein with respect to FIG. 9.

In certain aspects, operations 700 and 800 may also apply to CSI interference measurements (CSI-IM) resources. For example, the UE may determine schedules for CSI-IM resources and/or CSI-RS transmissions as described herein with respect to FIGS. 7-14. The BS may transmit CSI-RSs on the CCs according to the various schedules for slots n and n' as described herein with respect to FIGS. 9-14.

In certain aspects, the UE may receive control signaling from the BS indicating offset values (e.g., values for slot offset x or x' as shown in FIG. 9) for determining the schedules for the CSI-RS transmissions as described herein. The UE may determine schedules for the CSI-RS transmissions based on the indicated offset values as described herein with respect to FIG. 9.

In certain aspects, the UE may determine a CSI processing time requirement based on subcarrier spacing (SCS) numerologies of the CCs (e.g., an SCS numerology of $\mu=0$ may correspond to an SCS of 15 kHz, an SCS numerology of $\mu=1$ may correspond to an SCS of 30 kHz, etc.). The CSI processing time requirement may be used in determining various parameters during the monitoring and reporting of CSI feedback. Such a parameter may be the CSI computational delay which sets the minimum time for measuring the CSI-RS transmission and determining the CSI report before reporting the CSI feedback to the base station. Another example of a parameter derived from the CSI processing time requirement is the time offset of the CSI reference resource or preparation time, which is derived from Z' for a given CSI latency and/or numerology as further described herein.

Figure 15:
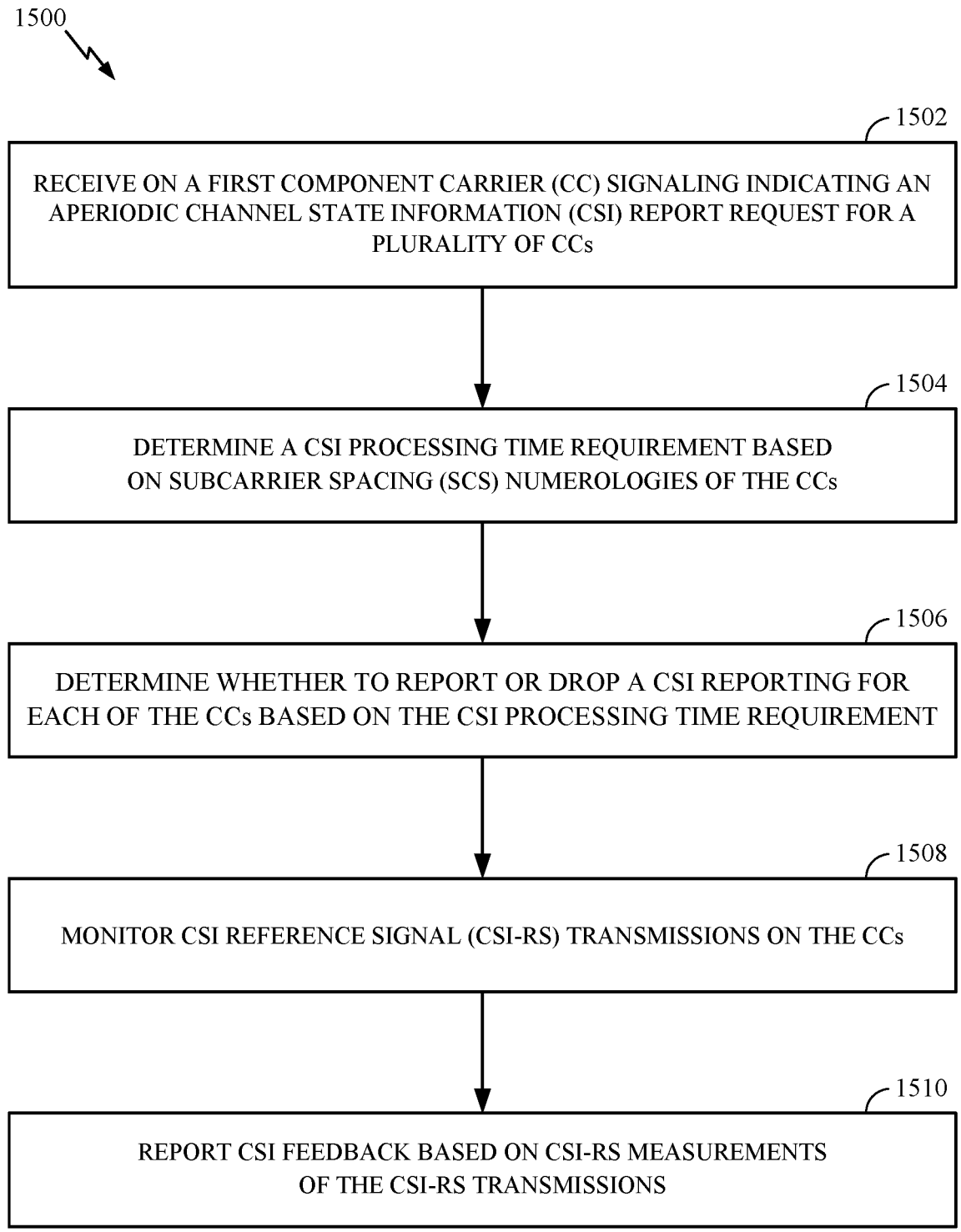
FIG. 15 is a flow diagram showing example operations of determining a CSI processing time requirement, in accordance with certain aspects of the present disclosure.

FIG. 15 is a flow diagram illustrating example operations 1500 that may be performed, for example, by a UE (e.g., UE 120), for determining the CSI processing time requirement, in accordance with certain aspects of the present disclosure.

Operations 1500 may begin, at 1502, where the UE receives on a first component carrier (CC) signaling indicating an aperiodic channel state information (CSI) report request for a plurality of component carriers (CCs). At 1504, the UE determines a CSI processing time requirement based on subcarrier spacing (SCS) numerologies of the CCs. At 1506, the UE determines whether to report or drop a CSI reporting for each of the CCs based on the CSI processing time requirement. At 1508, the UE monitors CSI reference signal (CSI-RS) transmissions on the CCs. At 1510, the UE reports CSI feedback based on CSI-RS measurements of the CSI-RS transmissions.

Figure 16:
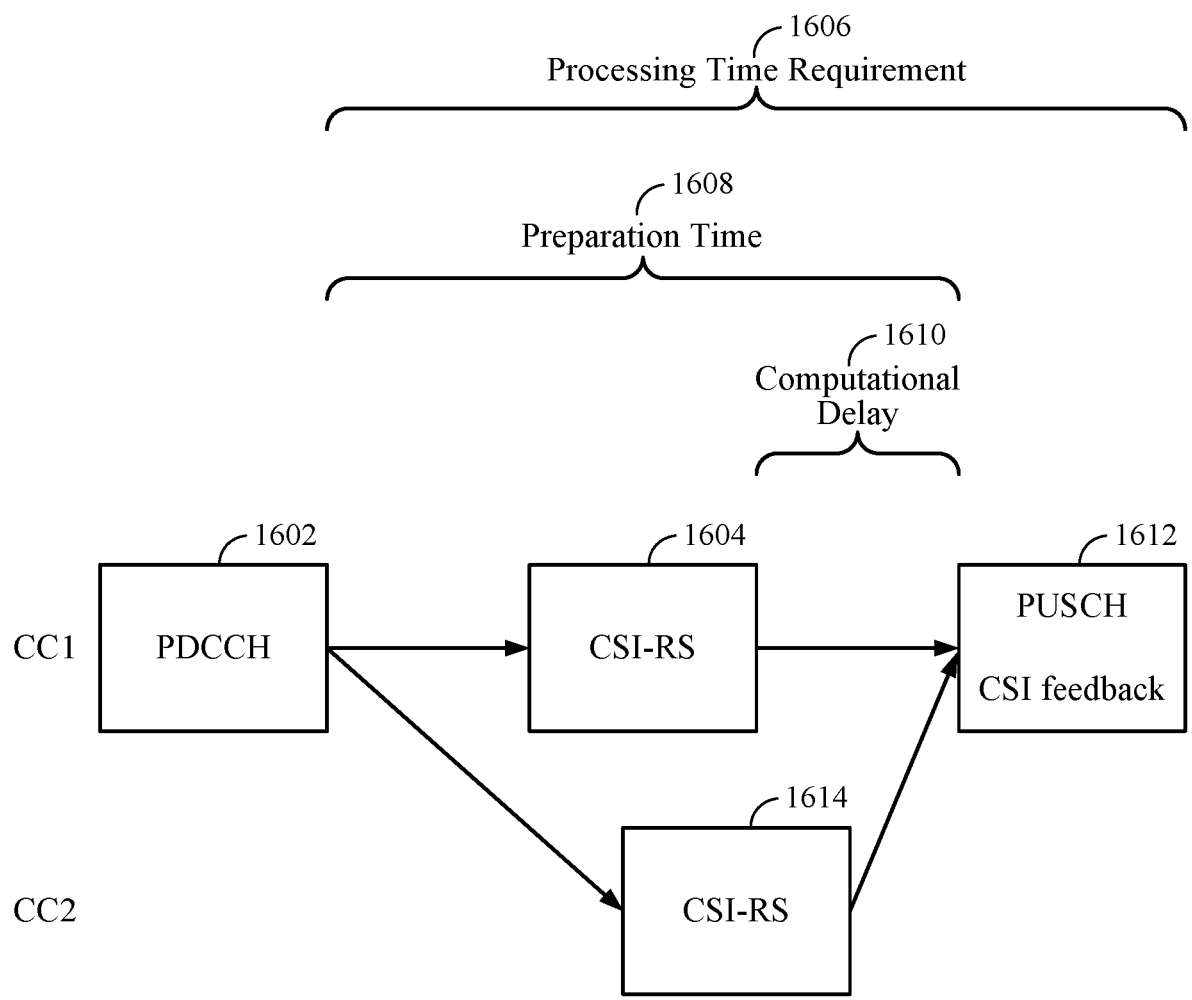
FIG. 16 is a timing diagram illustrating an example of determining a CSI processing time requirement, in accordance with certain aspects of the present disclosure.

FIG. 16 is a block diagram illustrating an example of cross-carrier scheduling for A-CSI feedback in which the CSI processing time requirement is determined, in accordance with certain aspects of the present disclosure. As shown, the UE is configured to communicate on two component carriers, CC1 and CC2. The UE receives downlink control signaling 1602 (e.g., a DCI message), which indicates a request to provide a cross-carrier A-CSI report to the base station, via a PDCCH on CC1. As described herein, the UE may determine the scheduling for the CSI-RS transmissions 1604 and 1614 as indicated by the downlink control signaling 1602. Suppose, for example, that the SCS of CC2 is greater than the SCS of CC1, slot n' may be defined as the next slot not overlapping with the last symbol of the control signaling received on a CC1 as described herein with respect to FIG. 10.

At 1504, the UE may determine the processing time requirement 1606 based on SCSs of the CCs scheduled for CSI feedback reporting. As an example, the UE may identify a minimum SCS among SCSs for at least one of one or more physical downlink control channels (PDCCHs), one or more physical uplink shared channels (PUSCHs), or one or more CSI-RS transmissions, as provided by the following expression:

$$\mu = \min(\mu_{1,PDCCH}, \mu_{1,CSI-RS}, \mu_{2,CSI-RS}, \ldots, \mu_{n,CSI-RS}, \mu_{1,PUSCH}) \quad (1)$$

where $\mu_{n,PDCCH}$ corresponds to the subcarrier spacing of the PDCCH with which the control signalling (e.g., a DCI message) was transmitted to trigger the A-CSI, $\mu_{n,PUSCH}$ corresponds to the subcarrier spacing of the PUSCH with which the CSI report is to be transmitted, and $\mu_{1\ldots n,CSI-RS}$ corresponds to the minimum subcarrier spacing of the aperiodic CSI-RS triggered by the control signalling (e.g., the DCI message).

The minimum SCS $\mu$ may be used, for example, to determine the processing time requirement 1606, the preparation time 1608, and/or the computational delay 1610. The processing time requirement 1606 may include the preparation time 1608 and the computational delay 1610. The preparation time 1608 may correspond to the time between the last symbol of the DCI message to the first symbol of the PUSCH which transmits the CSI feedback report. The computational delay 1610 may correspond to the time between the last symbol of the CSI-RS and the first symbol of the PUSCH which transmits the CSI feedback report.

The processing time requirement 1606, the preparation time 1608, or the computational delay 1610 may depend on a minimum SCS selected among SCSs. For instance, Table 1 provides computational delays for SCS numerologies 0 through 4. (Z,Z') may be defined as $(Z_1, Z'_1)$ in certain instances where the CSI report requested is associated with wideband frequency-granularity, otherwise (Z,Z') may be defined as the $(Z_2, Z'_2)$. It should be appreciated that the values of $(Z_1, Z'_1)$ and $(Z_2, Z'_2)$ in Table 1 are merely examples, and other suitable values of $(Z_1, Z'_1)$ and $(Z_2, Z'_2)$ may be used. For instance, values for $(Z_1, Z'_1)$ and $(Z_2, Z'_2)$ may also depend on low latency or high latency requirements for the CSI feedback or the capabilities of the UE (e.g., normal or advanced).

TABLE 1

Computational Delay

| μ | $Z_1$ [OFDM symbols] | | $Z_2$ [OFDM symbols] | |
|---|---|---|---|---|
| | $Z_1$ | $Z'_1$ | $Z_2$ | $Z'_2$ |
| 0 | 22 | 14 | 35 | 27 |
| 1 | 24 | 16 | 35 | 27 |
| 2 | 33 | 25 | 39 | 31 |
| 3 | 36 | 25 | N/A | N/A |

The SCS μ of Table 1 may correspond to the SCS μ given by Eq. (1). The SCS μ of Table 1 may also correspond to the min($\mu_{DL}, \mu_{UL}$) where the $\mu_{DL}$ corresponds to the subcarrier spacing of the PDCCH with which the DCI was transmitted and $\mu_{UL}$ corresponds to the subcarrier spacing of the PUSCH with which the CSI report is to be transmitted. In certain aspects, other suitable tables may be provided for determining the processing time requirement and/or the preparation time 1608 based on SCS Referring to FIG. 16, the UE may use the processing time requirement to determine whether to report or drop a CSI reporting for each of the CCs scheduled for CSI feedback. The UE may determine the computational delay 1610 based on the identified minimum SCS (μ), and the UE may measure the feedback based on the received CSI-RS transmissions 1604 and 1614. The UE may report the CSI feedback 1612 not earlier than the computational delay 1610 via the PUSCH.

Figure 17:
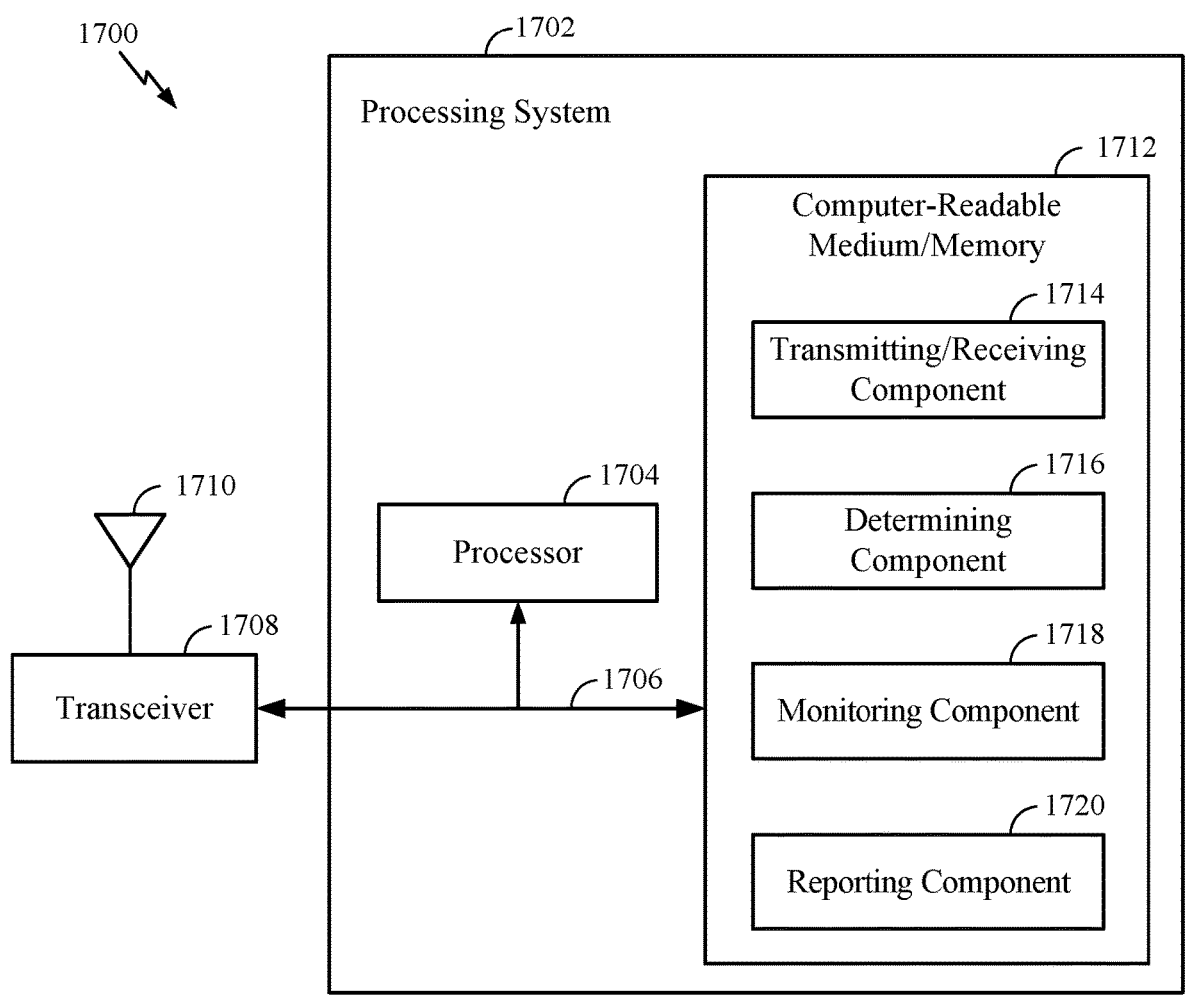
FIG. 17 illustrates a communications device that may include various components configured to perform operations for the techniques disclosed herein in accordance with aspects of the present disclosure.

FIG. 17 illustrates a communications device 1700 (e.g., BS 110 or UE 120) that may include various components (e.g., corresponding to means-plus-function components) configured to perform operations for the techniques disclosed herein, such as the operations illustrated in FIGS. 7 and 15. The communications device 1700 includes a processing system 1702 coupled to a transceiver 1708. The transceiver 1708 is configured to transmit and receive signals for the communications device 1700 via an antenna 1710, such as the various signal described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions that when executed by processor 1704, cause the processor 1704 to perform the operations illustrated in FIGS. 7, 8, and 15, or other operations for performing the various techniques discussed herein.

In certain aspects, the processing system 1702 further includes a transmitting/receiving component 1714 for performing the operations illustrated in FIGS. 7, 8, and 15. Additionally, the processing system 1702 includes a determining component 1716 for performing the operations illustrated in FIGS. 7, 8, and 15. Additionally, the processing system 1702 includes a monitoring component 1718 for performing the operations illustrated in FIGS. 7, 8, and 15. Additionally, the processing system 1702 includes a reporting component 1720 for performing the operations illustrated in FIGS. 7, 8, and 15. The transmitting/receiving component 1714, determining component 1716, monitoring component 1718, and reporting component 1720 may be coupled to the processor 1704 via bus 1706. In certain aspects, the transmitting/receiving component 1714, determining component 1716, monitoring component 1718, and reporting component 1720 may be hardware circuits. In certain aspects, the transmitting/receiving component 1714, determining component 1716, monitoring component 1718, and reporting component 1720 may be software components that are executed and run on processor 1704.

EXAMPLE EMBODIMENTS

In addition to the embodiments described above, many examples of specific combinations are within the scope of the disclosure, some of which are detailed below:

Embodiment 1: A method of wireless communication, comprising: receiving on a first component carrier (CC) signaling indicating an aperiodic channel state information (CSI) report request for a plurality of CCs; determining schedules for at least CSI reference signal (CSI-RS) transmissions on the CCs based on the received signaling; monitoring CSI-RS transmissions on the CCs according to the determined schedules; and reporting CSI feedback based on CSI-RS measurements of the CSI-RS transmissions.

Embodiment 2: The method of embodiment 1, wherein the CCs include the first CC and a second CC; the first and second CCs include a same subcarrier spacing (SCS) or different SCSs, and wherein receiving on the first CC signaling comprises receiving signaling via a physical downlink control channel (PDCCH).

Embodiment 3: The method of embodiment 2, wherein determining the schedules comprises: identifying that the SCS of the second CC is greater than the SCS of the first CC; and determining, based on the identification, that a schedule for one of the CSI-RS transmissions on the second CC is offset from an earliest slot of the second CC later than a last symbol of the PDCCH received on the first CC.

Embodiment 4: The method of embodiment 2, wherein determining the schedules comprises: identifying that the SCS of the second CC is less than or equal to the SCS of the first CC; and determining, based on the identification, that a schedule for one of the CSI-RS transmissions on the second CC is offset from a slot of the second CC that aligns with a slot of the first CC on which the signaling is received.

Embodiment 5: The method of embodiment 2, wherein determining the schedules comprises: identifying that the SCS of the first CC is greater than the SCS of the second CC and the second CC is not configured for CSI reporting; and determining, based on the identification, that a schedule for one of the CSI-RS transmissions on the second CC is offset from a slot of the second CC overlapping with a slot of the first CC on which the signaling is received.

Embodiment 6: The method of embodiment 2, wherein determining the schedules comprises determining that a schedule for one of the CSI-RS transmissions on the second CC is offset from a slot of the second CC overlapping with a slot of the first CC on which the signaling is received.

Embodiment 7: The method of embodiment 2, wherein determining the schedules comprises: identifying that the SCS of the second CC is greater than the SCS of the first CC; and determining, based on the identification, that a schedule for one of the CSI-RS transmissions on the second CC is offset from a slot of the second CC that aligns with a last symbol of a slot of the first CC on which the signaling is received.

Embodiment 8: The method according to any of embodiments 1-7, further comprising receiving control signaling indicating offset values for determining the schedules for the CSI-RS transmissions, and wherein determining the schedules comprises determining the schedules based on the indicated offset values.

Embodiment 9: A method of wireless communication, comprising: receiving on a first component carrier (CC) signaling indicating an aperiodic channel state information (CSI) report request for a plurality of CCs; determining a CSI processing time requirement based on subcarrier spacing (SCS) numerologies of the CCs; determining whether to report or drop a CSI reporting for each of the CCs based on the CSI processing time requirement; monitoring CSI reference signal (CSI-RS) transmissions on the CCs; and reporting CSI feedback based on CSI-RS measurements of the CSI-RS transmissions.

Embodiment 10: The method of embodiment 9, wherein the CCs include the first CC and a second CC; the first and second CCs having a same SCS or different SCSs, and wherein receiving on the first CC signaling comprises receiving the signaling via a physical downlink control channel (PDCCH).

Embodiment 11: The method according to any of embodiments 9 or 10, wherein: determining the processing time requirement comprises determining a computational delay for determining the CSI feedback based on SCSs of the CCs; and reporting the CSI feedback comprises reporting the CSI feedback not earlier than the computational delay.

Embodiment 12: The method according to any of embodiments 9 or 10, wherein determining the processing time requirement comprises: identifying a minimum SCS among SCSs for at least one of one or more physical downlink control channels (PDCCHs), one or more physical uplink shared channels (PUSCHs), or one or more CSI-RS transmissions; and determining the processing time requirement based on the identified minimum SCS.

Embodiment 13: The method according to any of embodiments 9-12, further comprising determining schedules for at least the CSI-RS transmissions on the CCs based on the received signaling, and wherein monitoring CSI-RS transmissions comprises monitoring the CSI-RS transmissions on the CCs according to the determined schedules.

Embodiment 14: An apparatus for wireless communication, comprising: a receiver configured to receive on a first component carrier (CC) signaling indicating an aperiodic channel state information (CSI) report request for a plurality of CCs; a processing system configured to: determine schedules for at least CSI reference signal (CSI-RS) transmissions on the CCs based on the received signaling, and monitor CSI-RS transmissions on the CCs according to the determined schedules; and a transmitter configured to transmit CSI feedback based on CSI-RS measurements of the CSI-RS transmissions.

Embodiment 15: The apparatus of embodiment 14, wherein the CCs include the first CC and a second CC; the first and second CCs include a same subcarrier spacing (SCS) or different SCSs, and wherein receiving on the first CC signaling comprises receiving signaling via a physical downlink control channel (PDCCH).

Embodiment 16: The apparatus of embodiment 15, wherein the processing system is configured to determine the schedules by at least in part: identifying that the SCS of the second CC is greater than the SCS of the first CC; and determining, based on the identification, that a schedule for one of the CSI-RS transmissions on the second CC is offset from an earliest slot of the second CC later than a last symbol of the PDCCH received on the first CC.

Embodiment 17: The apparatus of embodiment 15, wherein the processing system is configured to determine the schedules by at least in part identifying that the SCS of the second CC is less than or equal to the SCS of the first CC; and determining, based on the identification, that a schedule for one of the CSI-RS transmissions on the second CC is offset from a slot of the second CC that aligns with a slot of the first CC on which the signaling is received.

Embodiment 18: The apparatus of embodiment 15, wherein the processing system is configured to determine the schedules by at least in part identifying that the SCS of the first CC is greater than the SCS of the second CC and the second CC is not configured for CSI reporting; and determining, based on the identification, that a schedule for one of the CSI-RS transmissions on the second CC is offset from a slot of the second CC overlapping with a slot of the first CC on which the signaling is received.

Embodiment 19: The apparatus of embodiment 15, wherein the processing system is configured to determine the schedules by at least in part determining that a schedule for one of the CSI-RS transmissions on the second CC is offset from a slot of the second CC overlapping with a slot of the first CC on which the signaling is received.

Embodiment 20: The apparatus of embodiment 15, wherein the processing system is configured to determine the schedules by at least in part: identifying that the SCS of the second CC is greater than the SCS of the first CC; and determining, based on the identification, that a schedule for one of the CSI-RS transmissions on the second CC is offset from a slot of the second CC that aligns with a last symbol of a slot of the first CC on which the signaling is received.

Embodiment 21: The apparatus according to any of embodiments 14-20, wherein: the receiver is configured to receive control signaling indicating offset values for determining the schedules for the CSI-RS transmissions, and the processing system is configured to determine the schedules by at least in part determining the schedules based on the indicated offset values.

Embodiment 22: An apparatus for wireless communication, comprising: a receiver configured to receive on a first component carrier (CC) signaling indicating an aperiodic channel state information (CSI) report request for a plurality of CCs a processing system configured to: determine a CSI processing time requirement based on subcarrier spacing (SCS) numerologies of the CCs, determine whether to report or drop a CSI reporting for each of the CCs based on the CSI processing time requirement, and monitor CSI reference signal (CSI-RS) transmissions on the CCs; and a transmitter configured to transmit CSI feedback based on CSI-RS measurements of the CSI-RS transmissions.

Embodiment 23: The apparatus of embodiment 22, wherein the CCs include the first CC and a second CC; the first and second CCs having a same SCS or different SCSs, and wherein receiving on the first CC signaling comprises receiving the signaling via a physical downlink control channel (PDCCH).

Embodiment 24: The apparatus according to any of embodiments 22 or 23, wherein: the processing system is configured to determine the processing time requirement by at least in part determining a computational delay for determining the CSI feedback based on SCSs of the CCs; and the transmitter is configured to transmit the CSI feedback not earlier than the computational delay.

Embodiment 25: The apparatus according to any of embodiments 22 or 23, wherein the processing system is configured to determine the processing time requirement by at least in part: identifying a minimum SCS among SCSs for at least one of one or more physical downlink control channels (PDCCHs), one or more physical uplink shared channels (PUSCHs), or one or more CSI-RS transmissions; and determining the processing time requirement based on the identified minimum SCS.

Embodiment 26: The apparatus according to any of embodiments 22-25, wherein the processing system is configured to: determine schedules for at least the CSI-RS transmissions on the CCs based on the received signaling, and monitor the CSI-RS transmissions on the CCs according to the determined schedules.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7, 8, and 15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication, comprising:
   receiving on a first component carrier (CC) signaling indicating an aperiodic channel state information (CSI) report request for a plurality of CCs including the first CC and a second CC, wherein the first CC has a different subcarrier spacing (SCS) than the second CC;
   determining schedules for at least CSI reference signal (CSI-RS) transmissions on the CCs based on the received signaling;
   monitoring CSI-RS transmissions on the CCs according to the determined schedules; and
   reporting CSI feedback based on CSI-RS measurements of the CSI-RS transmissions.

2. The method of claim 1, wherein receiving on the first CC the signaling comprises receiving the signaling via a physical downlink control channel (PDCCH).

3. The method of claim 2, wherein determining the schedules comprises:
   identifying that the SCS of the second CC is greater than the SCS of the first CC; and
   determining, based on the identification, that a schedule for one of the CSI-RS transmissions on the second CC is offset from an earliest slot of the second CC later than a last symbol of the PDCCH received on the first CC.

4. The method of claim 2, wherein determining the schedules comprises:
   identifying that the SCS of the second CC is less than or equal to the SCS of the first CC; and
   determining, based on the identification, that a schedule for one of the CSI-RS transmissions on the second CC is offset from a slot of the second CC that aligns with a slot of the first CC on which the signaling is received.

5. The method of claim 2, wherein determining the schedules comprises:
   identifying that the SCS of the first CC is greater than the SCS of the second CC and the second CC is not configured for CSI reporting; and determining, based on the identification, that a schedule for one of the CSI-RS transmissions on the second CC is offset from a slot of the second CC overlapping with a slot of the first CC on which the signaling is received.

6. The method of claim 2, wherein determining the schedules comprises determining that a schedule for one of the CSI-RS transmissions on the second CC is offset from a slot of the second CC overlapping with a slot of the first CC on which the signaling is received.

7. The method of claim 2, wherein determining the schedules comprises:
identifying that the SCS of the second CC is greater than the SCS of the first CC; and
determining, based on the identification, that a schedule for one of the CSI-RS transmissions on the second CC is offset from a slot of the second CC that aligns with a last symbol of a slot of the first CC on which the signaling is received.

8. The method of claim 1, further comprising receiving control signaling indicating offset values for determining the schedules for the CSI-RS transmissions, and wherein determining the schedules comprises determining the schedules based on the indicated offset values.

9. A method of wireless communication, comprising:
receiving on a first component carrier (CC) signaling indicating an aperiodic channel state information (CSI) report request for a plurality of CCs including the first CC and a second CC, wherein the first CC has a different subcarrier spacing (SCS) than the second CC;
determining a CSI processing time requirement based on subcarrier spacing (SCS) numerologies of the CCs;
determining whether to report or drop a CSI reporting for each of the CCs based on the CSI processing time requirement;
monitoring CSI reference signal (CSI-RS) transmissions on the CCs; and
reporting CSI feedback based on CSI-RS measurements of the CSI-RS transmissions.

10. The method of claim 9, wherein receiving on the first CC the signaling comprises receiving the signaling via a physical downlink control channel (PDCCH).

11. The method of claim 9, wherein:
determining the processing time requirement comprises determining a computational delay for determining the CSI feedback based on SCSs of the CCs; and
reporting the CSI feedback comprises reporting the CSI feedback not earlier than the computational delay.

12. The method of claim 9, wherein determining the processing time requirement comprises:
identifying a minimum SCS among SCSs for at least one of one or more physical downlink control channels (PDCCHs), one or more physical uplink shared channels (PUSCHs), or one or more CSI-RS transmissions; and
determining the processing time requirement based on the identified minimum SCS.

13. The method of claim 9, further comprising determining schedules for at least the CSI-RS transmissions on the CCs based on the received signaling, and wherein monitoring CSI-RS transmissions comprises monitoring the CSI-RS transmissions on the CCs according to the determined schedules.

14. An apparatus for wireless communication, comprising:
a receiver configured to receive on a first component carrier (CC) signaling indicating an aperiodic channel state information (CSI) report request for a plurality of CCs including the first CC and a second CC, wherein the first CC has a different subcarrier spacing (SCS) than the second CC;
a memory;
a processor coupled to the memory, the processor being configured to:
determine schedules for at least CSI reference signal (CSI-RS) transmissions on the CCs based on the received signaling, and
monitor CSI-RS transmissions on the CCs according to the determined schedules; and
a transmitter configured to transmit CSI feedback based on CSI-RS measurements of the CSI-RS transmissions.

15. The apparatus of claim 14, wherein to receive the signaling, the receiver is configured to receive the signaling via a physical downlink control channel (PDCCH).

16. The apparatus of claim 15, wherein the processor is configured to determine the schedules by at least in part:
identifying that the SCS of the second CC is greater than the SCS of the first CC; and
determining, based on the identification, that a schedule for one of the CSI-RS transmissions on the second CC is offset from an earliest slot of the second CC later than a last symbol of the PDCCH received on the first CC.

17. The apparatus of claim 15, wherein the processor is configured to determine the schedules by at least in part:
identifying that the SCS of the second CC is less than or equal to the SCS of the first CC; and
determining, based on the identification, that a schedule for one of the CSI-RS transmissions on the second CC is offset from a slot of the second CC that aligns with a slot of the first CC on which the signaling is received.

18. The apparatus of claim 15, wherein the processor is configured to determine the schedules by at least in part:
identifying that the SCS of the first CC is greater than the SCS of the second CC and the second CC is not configured for CSI reporting; and
determining, based on the identification, that a schedule for one of the CSI-RS transmissions on the second CC is offset from a slot of the second CC overlapping with a slot of the first CC on which the signaling is received.

19. The apparatus of claim 15, wherein the processor is configured to determine the schedules by at least in part determining that a schedule for one of the CSI-RS transmissions on the second CC is offset from a slot of the second CC overlapping with a slot of the first CC on which the signaling is received.

20. The apparatus of claim 15, wherein the processor is configured to determine the schedules by at least in part:
identifying that the SCS of the second CC is greater than the SCS of the first CC; and
determining, based on the identification, that a schedule for one of the CSI-RS transmissions on the second CC is offset from a slot of the second CC that aligns with a last symbol of a slot of the first CC on which the signaling is received.

21. The apparatus of claim 14, wherein:
the receiver is configured to receive control signaling indicating offset values for determining the schedules for the CSI-RS transmissions, and
the processor is configured to determine the schedules by at least in part determining the schedules based on the indicated offset values.

22. An apparatus for wireless communication, comprising:
a receiver configured to receive on a first component carrier (CC) signaling indicating an aperiodic channel state information (CSI) report request for a plurality of CCs including the first CC and a second CC, wherein the first CC has a different subcarrier spacing (SCS) than the second CC;

a memory;

a processor coupled to the memory, the processor being configured to:
  determine a CSI processing time requirement based on subcarrier spacing (SCS) numerologies of the CCs,
  determine whether to report or drop a CSI reporting for each of the CCs based on the CSI processing time requirement, and
  monitor CSI reference signal (CSI-RS) transmissions on the CCs; and a transmitter configured to transmit CSI feedback based on CSI-RS measurements of the CSI-RS transmissions.

23. The apparatus of claim 22, wherein to receive the signaling the processor is further configured to receive the signaling via a physical downlink control channel (PDCCH).

24. The apparatus of claim 22, wherein:
the processor is configured to determine the processing time requirement by at least in part determining a computational delay for determining the CSI feedback based on SCSs of the CCs; and
the transmitter is configured to transmit the CSI feedback not earlier than the computational delay.

25. The apparatus of claim 22, wherein the processor is configured to determine the processing time requirement by at least in part:
  identifying a minimum SCS among SCSs for at least one of one or more physical downlink control channels (PDCCHs), one or more physical uplink shared channels (PUSCHs), or one or more CSI-RS transmissions; and
  determining the processing time requirement based on the identified minimum SCS.

26. The apparatus of claim 22, wherein the processor is configured to:
  determine schedules for at least the CSI-RS transmissions on the CCs based on the received signaling, and
  monitor the CSI-RS transmissions on the CCs according to the determined schedules.

* * * * *